(12) United States Patent
Blades et al.

(10) Patent No.: US 12,551,758 B2
(45) Date of Patent: Feb. 17, 2026

(54) SYSTEM AND METHOD FOR DETERMINING RUNNING POWER

(71) Applicant: Orpyx Medical Technologies Inc., Calgary (CA)

(72) Inventors: Samuel Carl William Blades, Victoria (CA); Eric Christian Honert, Calgary (CA); Benno Maurus Nigg, Calgary (CA)

(73) Assignee: ORPYX MEDICAL TECHNOLOGIES INC., Calgary (CA)

( * ) Notice: Subject to any disclaimer, the term of this patent is extended or adjusted under 35 U.S.C. 154(b) by 420 days.

(21) Appl. No.: 17/990,598

(22) Filed: Nov. 18, 2022

(65) Prior Publication Data

US 2023/0158368 A1 May 25, 2023

Related U.S. Application Data

(60) Provisional application No. 63/315,847, filed on Mar. 2, 2022, provisional application No. 63/291,517, filed (Continued)

(30) Foreign Application Priority Data

Sep. 27, 2022 (CA) ...................... 3176034

(51) Int. Cl.
*A63B 24/00* (2006.01)
*A61B 5/00* (2006.01)
(Continued)

(52) U.S. Cl.
CPC ......... *A63B 24/0062* (2013.01); *G06N 3/044* (2023.01); *A61B 5/1038* (2013.01);
(Continued)

(58) Field of Classification Search
CPC ............ A63B 24/0062; A63B 2220/22; A63B 2220/30; A63B 2220/40; A63B 2220/51;
(Continued)

(56) References Cited

U.S. PATENT DOCUMENTS 5,955,667 A 9/1999 Fyfe
8,060,337 B2 11/2011 Kulach et al.
(Continued)

FOREIGN PATENT DOCUMENTS

CN 105708469 A 6/2016
LU 101071 B1 6/2020
(Continued)

OTHER PUBLICATIONS

De Ruiter et al. (Running Speed Can Be Predicted from Foot Contact Time during Outdoor over Ground Running. PLoS One. Sep. 20, 2016;11(9):e0163023. doi: 10.1371/journal.pone.0163023. PMID: 27648946; PMCID: PMC5029865) (Year: 2016).*
(Continued)

*Primary Examiner* — Lisa M Caputo
*Assistant Examiner* — Christian T Bryant
(74) *Attorney, Agent, or Firm* — ABM INTELLECTUAL PROPERTY INC.; Adrienne Bieber McNeil

(57) ABSTRACT

A system, method and computer program product for determining mechanical running power. A plurality of sensor readings is acquired from a plurality of force sensors positioned underfoot. Force values are determined for a plurality of strides using aggregate force data. The slope, a stance time and running speed are determined for each stride. The mechanical running power associated with the plurality of sensor readings is determined by inputting the force values, the slope, the stance time and the running speed to a machine learning model trained to predict the mechanical running power. The mechanical running power can then be provided
(Continued)

to the user as feedback or stored for purposes such as later review and analysis. The inputs to the machine learning model can be determined entirely based off of sensor data received from a wearable device worn by the user.

19 Claims, 8 Drawing Sheets

Related U.S. Application Data on Dec. 20, 2021, provisional application No. 63/291,424, filed on Dec. 19, 2021, provisional application No. 63/282,234, filed on Nov. 23, 2021.

(51) Int. Cl.

| | |
|---|---|
| A61B 5/103 | (2006.01) |
| A61B 5/11 | (2006.01) |
| G06N 3/044 | (2023.01) |
| G06N 20/00 | (2019.01) |
| G16H 15/00 | (2018.01) |
| G16H 20/30 | (2018.01) |
| G16H 40/63 | (2018.01) |
| G16H 40/67 | (2018.01) |
| G16H 50/20 | (2018.01) |
| G16H 50/30 | (2018.01) |
| G16H 50/70 | (2018.01) |

(52) U.S. Cl.
CPC .............. A61B 5/112 (2013.01); A61B 5/7267 (2013.01); A63B 2220/22 (2013.01); A63B 2220/30 (2013.01); A63B 2220/40 (2013.01); A63B 2220/51 (2013.01); A63B 2220/62 (2013.01); A63B 2220/836 (2013.01); G06N 20/00 (2019.01); G16H 15/00 (2018.01); G16H 20/30 (2018.01); G16H 40/63 (2018.01); G16H 40/67 (2018.01); G16H 50/20 (2018.01); G16H 50/30 (2018.01); G16H 50/70 (2018.01)

(58) Field of Classification Search
CPC .......... A63B 2220/62; A63B 2220/836; A63B 5/1038; A63B 5/112; A63B 5/7267; G06N 3/044; G06N 20/00; G16H 15/00; G16H 40/63; G16H 40/67; G16H 50/20; G16H 50/30; G16H 50/70; G16H 20/30; A61B 5/1038; A61B 5/112; A61B 5/7267
See application file for complete search history.

(56) References Cited

U.S. PATENT DOCUMENTS

| | | | |
|---|---|---|---|
| 8,744,783 | B2 | 6/2014 | Templeman |
| 9,216,320 | B2 | 12/2015 | Ishii |
| 9,993,181 | B2 | 6/2018 | Ross |
| 10,744,371 | B2 | 8/2020 | Mohrman et al. |
| 11,105,696 | B2 | 8/2021 | Mariani et al. |
| 2011/0178720 | A1* | 7/2011 | Bamberg .............. A61B 5/6807 702/19 |
| 2014/0066816 | A1 | 3/2014 | McNames et al. |
| 2015/0065893 | A1 | 3/2015 | Ye |
| 2015/0351665 | A1 | 12/2015 | Ross |
| 2018/0043211 | A1* | 2/2018 | Mohrman .............. A61B 5/7271 |
| 2018/0046215 | A1 | 2/2018 | Gosieski, Jr. et al. |
| 2020/0000373 | A1 | 1/2020 | Agrawal et al. |
| 2020/0072690 | A1* | 3/2020 | Mariani .................... A43B 3/44 |
| 2020/0218974 | A1 | 7/2020 | Cheng et al. |

FOREIGN PATENT DOCUMENTS

| | | |
|---|---|---|
| WO | 2009152456 A2 | 12/2009 |
| WO | 2014089238 A1 | 6/2014 |
| WO | 2015121690 A1 | 8/2015 |
| WO | 2017157604 A1 | 9/2017 |
| WO | 2018087654 A1 | 5/2018 |
| WO | 2020152817 A1 | 7/2020 |
| WO | 2021092676 A1 | 5/2021 |

OTHER PUBLICATIONS

Zhang et al.("Accurate Ambulatory Gait Analysis in Walking and Running Using Machine Learning Models," in IEEE Transactions on Neural Systems and Rehabilitation Engineering, vol. 28, No. 1, pp. 191-202, Jan. 2020, doi: 10.1109/TNSRE.2019.2958679.) (Year: 2020).*
Kuan Zhang et al., Assessment of human locomotion by using an insole measurement system and artificial neural networks, Journal of Biomechanics, 2005, 38(11), pp. 2276-2287.
Victor Cerezuela-Espejo et al., Are we ready to measure running power? Repeatability and concurrent validity of five commercial technologies, European Journal of Sport Science, 2021, 21(3), pp. 341-350.
Jean-Benoit Morin et al., A simple method for computing sprint acceleration kinetics from running velocity data: Replication study with improved design, Journal of Biomechanics, 2019, 94, pp. 82-87.
David F. Jenny et al., On the mechanical power output required for human running—Insight from an analytical model, Journal of Biomechanics, 2020, 110(2), pp. 109948-109955.
Victor Cerezuela-Espejo et al., Running power meters and theoretical models based on laws of physics: Effects of environments and running conditions, Physiology & Behavior, 2020, 223, pp. 112972-112977.
Gaspare Pavei et al., Comprehensive mechanical power analysis in sprint running acceleration, Scandinavian Journal of Medicine and Science in Sports, 2019, 29(12), pp. 1892-1900.
Marine Devise et al., Simple method for measuring center of mass work during field running, Journal of Biomechanics, 2019, 97, pp. 109369-109373.
Jonatan Fridolfsson et al., A Biomechanical Re-Examination of Physical Activity Measurement with Accelerometers, Sensors, 2018, 18(10), pp. 3399-3411.
Matteo Zago et al., Kinematic algorithm to determine the energy cost of running with changes of direction, Journal of Biomechanics, 2018, 76, pp. 189-196.
Gaspare Pavei et al., On the Estimation Accuracy of the 3D Body Center of Mass Trajectory during Human Locomotion: Inverse vs. Forward Dynamics, Frontiers in Physiology, 2017, 8(129).
A. H. Dewolf et al., The rebound of the body during uphill and downhill running at different speeds, Journal of Experimental Biology, 2016, 219(15), pp. 2276-2288.
P. Samozino et al., A simple method for measuring power, force, velocity properties, and mechanical effectiveness in sprint running, Scandinavian Journal of Medicine and Science in Sports, 2016, 26(6), pp. 648-658.
R.C. Riddick et al., Soft tissues store and return mechanical energy in human running, Journal of Biomechanics, 2016, 49(3), pp. 436-441.
Gabriela Fischer et al., Effects of Fatigue on Running Mechanics: Spring-Mass Behavior in Recreational Runners after 60 Seconds of Countermovement Jumps, Journal of Applied Biomechanics, 2015, 31(6), pp. 445-451.
Wouter Hoogkamer et al., Applying the cost of generating force hypothesis to uphill running, PeerJ, 2014, 2, pp. 482-498.
Veerle Segers et al., Biomechanics of spontaneous overground walk-to-run transition, The Journal of Experimental Biology, 2013, 216(16), pp. 3047-3054.
Kristine L. Snyder et al., The role of elastic energy storage and recovery in downhill and uphill running, The Journal of Experimental Biology, 2012, 215(13), pp. 2283-2287.

(56) References Cited

OTHER PUBLICATIONS

G. A. Cavagna et al., Old men running: mechanical work and elastic bounce, Proceedings of the Royal Society B, 2008, 275(1633), pp. 411-418.
G. A. Cavagna et al., Effect of an increase in gravity on the power output and the rebound of the body in human running, The Journal of Experimental Biology, 2005, 208(12), pp. 2333-2346.
Jean Slawinski et al., Use of Lumbar Point for the Estimation of Potential and Kinetic Mechanical Power in Running, Journal of Applied Biomechanics, 2004, 20(3), pp. 324-331.
Franco Saibene et al., Biomechanical and physiological aspects of legged locomotion in humans, European Journal of Applied Physiology, 2003, 88(4-5), pp. 297-316.
Andrew R. Coggan, Training and racing using a power meter: an introduction, 2003.
Adamantios Arampatzis et al., Mechanical power in running: a comparison of different approaches, Journal of Biomechanics, 2000, 33(4), pp. 457-463.
Alberto E. Minetti, A model equation for the prediction of mechanical internal work of terrestrial locomotion, Journal of Biomechanics, 1998, 31(5), pp. 463-468.
Claire T. Farley et al., Biomechanics of Walking and Running: Center of Mass Movements to Muscle Action, Exercise and Sport Sciences Reviews, 1998, 26(1), pp. 253-285.
R. Candau et al., Energy cost and running mechanics during a treadmill run to voluntary exhaustion in humans, Journal of Applied Physiology, 1998, 77(6), pp. 479-485.
B. Schepens et al., The mechanics of running in children, Journal of Physiology, 1998, 509(3), pp. 927-940.
G. A. Cavagna et al., The resonant step frequency in human running, European Journal of Physiology, 1997, 434(6), pp. 678-684.
Tim Anderson, Biomechanics and Running Economy, Sports Medicine, 1996, 22(2), pp. 76-89.
Graham E. Caldwell et al., Energetic Comparison of Symmetrical and Asymmetrical Human Gait, Journal of Motor Behavior, 1995, 27(2), pp. 139-154.
P. A. Willems, External, Internal and Total Work in Human Locomotion, Journal of Experimental Biology, 1995, 198(2), pp. 379-393.
A. E. Minetti et al., Mechanical Determinants of the Minimum Energy Cost of Gradient Running in Humans, Journal of Experimental Biology, 1994, 195(1), pp. 211-225.
A. Belli et al., Mechanical Energy Assessment with Different Methods during Running, International Journal of Sports Medicine, 1993, 14(5), pp. 252-256.
Philip E. Martin., Interrelationships between mechanical power, energy transfers, and walking and running economy, Medicine and Science in Sports and Exercise, 1993, 25(4), pp. 508-515.
G. A. Cavagna., The Two Power Limits Conditioning Step Frequency in Human Running, Journal of Physiology, 1991, 437, pp. 95-108.
Masahiro Kaneko, Mechanics and Energetics in Running with Special Reference to Efficiency, Journal of Biomechanics, 1990, 23(1), pp. 57-63.
F. Saibene, The Mechanisms for Minimizing Energy Expenditure in Human Locomotion, European Journal of Clinical Nutrition, 1990, 44(1), pp. 65-71.
Keith R. Williams et al., Relationship between distance running mechanics, running economy, and performance, Journal of Applied Physiology, 1987, 63(3), pp. 1236-1245.
Shinji Sakurai et al., Mechanical energy changes during treadmill running, Medicine and Science in Sports and Exercise, 1985, 17(1), pp. 148-152.
Keith R. Willaims, A Model for the Calculation of Mechanical Power During Distance Running, Journal of Biomechanics, 1983, 16(2), pp. 115-128.
M. R. Shorten et al., Mechanical energy changes and the oxygen cost of running, Engineering in Medicine, 1981, 10(4), pp. 213-217.
M. Y. Zarrugh, Power Requirements and Mechanical Efficiency of Treadmill Walking, Journal of Biomechanics, 1981, 14(3), pp. 157-165.
M. R. Pierrynowski et al., Transfers of mechanical energy within the total body and mechanical efficiency during treadmill walking, Ergonomics, 23(2), pp. 147-156.
David A. Winter, A new definition of mechanical work done in human movement, Journal of Applied Physiology, 1979, 46(1), pp. 79-83.
Pekka Luhtanen et al., Mechanical Energy States during Running, European Journal of Applied Physiology and Occupational Physiology, 1978, 38(1), pp. 41-48.
D. A. Winter, Calculation and Interpretation of Mechanical Energy of Movement, Exercise and Sport Sciences Reviews, 1978, 6, pp. 183-201.
G. A. Cavagna, Mechanical Work and Efficiency in Level Walking and Running, The Journal of Physiology, 1977, 268(2), pp. 467-481.
R. W. Norman et al., Reexamination of the mechanical efficiency of horizontal treadmill running, Biomechanics VB, 1B, 1976, pp. 87-93.
G. A. Cavagna et al., The Sources of External Work in Level Walking and Running, The Journal of Physiology, 1976, 262(3), pp. 639-657.
Giovanni A. Cavagna, Force platforms as ergometers, Journal of Applied Physiology, 1985, 39(1), pp. 174-179.
Canadian Intellectual Property Office (CIPO), Examiner report dated Feb. 29, 2024 in counterpart foreign patent application No. CA 3,176,034.
G. A. Cavagna et al., Mechanical work in running, Journal of Applied Physiology, 1964, 19(2), pp. 249-256.
Rachel L. Aubry et al., An Assessment of Running Power as a Training Metric for Elite and Recreational Runners, Journal of Strength and Conditioning Research, 2018, 32(8), pp. 2258-2264.
Casey L. Austin et al., The Relationship between Running Power and Running Economy in Well-Trained Distance Runners, Sports, 2018, 6(4), pp. 142-151.
Hans Van Dijk et al., The Secret of Running, 2017, Chapter 3, Meyer & Meyer Sports, Germany.
M. J. Myers et al., Effect of Limb Mass and its Distribution on the Energetic Cost of Running, Journal of Experimental Biology, 1985, 116(1), pp. 363-373.
Philip Friere Skiba, Calculation of Power Output and Quantication of Training Stress in Distance Runners: The Development of the GOVSS Algorithm, 2006
Polar Pioneer of Wearable Sports Technology, Polar Running Power White Paper, 2018.
Stryd, How to Lead the Pack: Running Power Meters & Quality Data, 2017.
Stryd, Running Against the Wind: Adding Air Resistance Costs to Power Estimates in Running, 2019.
Eom, et al., "A Deep Learning-Based Optimal Smart Shoes Sensor Selection for Energy Expenditure and Heart Rate Estimation", Sensors 2021, 21, 7058. https://doi.org/10.3390/s21217058 (Year: 2021).
Liu, et al., 2020 J. Phys.: Conf. Ser. 1453 012009, IOP Publishing.
Saboor_Saboor, et al., "Latest Research Trends in Gait Analysis Using Wearable Sensors and Machine Learning: A Systematic Review," in IEEE Access, vol. 8, pp. 167830-167864, 2020 (Year: 2020).

* cited by examiner

SYSTEM AND METHOD FOR DETERMINING RUNNING POWER

CROSS-REFERENCE TO RELATED APPLICATIONS

This application claims the benefit of priority of Canadian Patent Application No. 3,176,034 filed Sep. 27, 2022, U.S. Provisional Application No. 63/315,847 filed Mar. 2, 2022, U.S. Provisional Application No. 63/291,517 filed Dec. 20, 2021, U.S. Provisional Application No. 63/291,424 filed Dec. 19, 2021, and U.S. Provisional Application No. 63/282,234 filed Nov. 23, 2021. All of the above applications are incorporated herein by reference.

FIELD

This document relates to systems and methods for processing data from sensors monitoring human movement or human activity. In particular, this document relates to determining mechanical running power using force sensor data.

BACKGROUND

U.S. Pat. No. 9,216,320 (Ishii) discloses a method and apparatus for measuring power output of exercise motion by a user. The system includes a wireless motion sensor and a wireless central mass unit. The wireless motion sensor detects, measures and transmits motion data associated with a first motion by the user. The central mass unit detects and measures motion data associated with a second motion by the user. The central mass unit also computes the power output of the first motion and the second motion as a function of the first motion data and the second motion data.

U.S. Pat. No. 10,744,371 (Mohrman et al.) discloses a sensing system and wearable sensor platform to provide real-time feedback to a user/wearer of power expenditure during an activity. In one example, the system includes an inertial measurement unit (IMU) for acquiring multi-axis motion data at a first sampling rate, and an orientation sensor to acquire orientation data at a second sampling rate that is varied based on the multi-axis motion data.

SUMMARY

The following summary is intended to introduce the reader to various aspects of the detailed description, but not to define or delimit any invention.

A system, method and computer program product for determining running power is disclosed. In some examples, force sensor data is acquired from a plurality of force sensors positioned underfoot of a user performing an activity such as running or walking. Using the force sensor data, force values can be determined for a plurality of strides. A corresponding slope, stance time and running speed can also be determined for each stride. The force values, slope, stance time and running speed can be provided as inputs to a machine learning model trained to determine the mechanical running power output by the user. The mechanical running power can then be provided to the user as feedback or stored for purposes such as review and analysis.

In some examples, the inputs to the machine learning model can be determined entirely based off of sensor data received from a wearable device worn by the user. The wearable device can include a plurality of force sensors and an inertial measurement unit. For example, an insole can be provided with the plurality of force sensors and the inertial measurement unit. Sensor data from the force sensors and the inertial measurement unit can be used to determine the force values, slope, stance time and running speed. This may allow the user to perform activities at various locations while still tracking and monitoring their mechanical running power output.

According to some aspects, a method for determining running power using force sensor data from a plurality of force sensors positioned underfoot includes: obtaining a plurality of force sensor readings from the plurality of force sensors; determining force values for a plurality of strides using aggregate force data based on the force sensor readings; for each stride in the plurality of strides, determining a slope value, a stance time value, and a running speed; and determining a mechanical running power associated with the plurality of force sensor readings by inputting the force values, the slope value, the stance time value and the running speed to a machine learning model trained to predict the mechanical running power.

The plurality of force sensors can be disposed on a wearable device that is worn on a foot.

The wearable device can include a deformable material.

The deformable material can be a foam.

The wearable device can be an insole.

The wearable device can be a shoe.

The wearable device can be a compression-fit garment.

The wearable device can be a sock.

The method can include outputting an output dataset, which can include the mechanical running power and/or the running speed.

The output dataset can be used as an input to a game.

The output dataset can be used to execute an action in the game.

A scaling factor can be applied to the output dataset in the game.

The scaling factor can be an integer.

The scaling factor can have a value of 1.

An avatar can be generated in the game with motion defined according to the output dataset.

The output dataset can be used to model the dynamics of virtual objects and surroundings with which a user interacts in the game.

A game score in the game can be calculated based on the output dataset.

A training goal can be generated based on the output dataset and/or the game score.

A percentage of progress towards achieving the training goal can be calculated based on the output dataset and/or the game score.

The training goal can be a range of mechanical running power values that the user must stay within for a predetermined period of time.

The training goal can be a range of running speed values that the user must stay within for a predetermined period of time.

A technique quality of a user performing a movement can be calculated from the output dataset.

A task readiness score can be calculated from the output dataset and/or the technique quality.

A first user can be challenged to replicate the output dataset of a second user in the game.

The wearable device can include at least one vibrotactile motor.

The at least one vibrotactile motor can generate a haptic signal based on the output dataset.

An audio signal can be generated based on the output dataset.

A visual display can be generated based on the output dataset.

The visual display can be an output dataset vs. time graph.

Determining the force values can include determining at least one mean force value.

The aggregate force data may be separated into a plurality of foot regions, and determining the at least one mean force value can include determining a region-specific mean force value for each foot region.

Determining the force values can include determining at least one peak force value.

The aggregate force data may be separated into a plurality of foot regions, and determining the at least one peak force value can include determining a region-specific peak force value for each foot region.

The slope value can be determined based on inertial measurement data received from an inertial measurement unit.

The method can include identifying the plurality of strides by: identifying a plurality of foot-contact times based on the force sensor readings and/or a plurality of foot-off times based on the force sensor readings; and identifying each stride as a stride period between adjacent foot-contact times or between adjacent foot-off times.

For each stride, the stance time value can be identified as the length of a foot contact period between the foot contact time and the foot off time.

For each stride, determining the running speed can include: identifying a stride time as the length of time of the corresponding stride period; identifying a stride length for the corresponding stride period based on inertial measurement data received from an inertial measurement unit; and determining the running speed as the stride length divided by the stride time.

Each stride can include a foot contact period between the foot contact time and the foot off time and identifying the stride length can include: determining a stride velocity based on the inertial measurement data; integrating the stride velocity over the length of time between adjacent foot contact periods to determine a stride displacement; and determining the stride length based on a combination of directional components of the stride displacement.

The inertial measurement data can include accelerometer data and determining the stride velocity can include: determining transformed accelerometer data by transforming the accelerometer data to a global reference frame; and determining the stride velocity by integrating the transformed accelerometer data.

The inertial measurement data can include angular velocity data and transforming the accelerometer data to a global reference frame can include: determining a subsequent foot flat time for the subsequent stride based on the inertial measurement data; determining a foot angle by integrating the angular velocity data from the foot-contact time to the subsequent foot flat time; and transforming the accelerometer data to the global reference frame based on the foot angle.

The method can further include determining a first foot flat time for the stride based on the inertial measurement data; determining a foot flat velocity value at the first foot flat time based on the integrated transformed accelerometer data; and adjusting the stride velocity by subtracting the foot flat velocity value.

The inertial measurement data can include gyroscope data and determining each foot flat time can include: determining a time of minimum gyroscope energy for the corresponding stride from the gyroscope data; and identifying the foot flat time as the time of minimum gyroscope energy.

Determining each foot flat time can include identifying a time of maximal plantar force for the corresponding stride based on the force sensor readings.

The machine learning model can be a regression model. The regression model can be a LASSO model.

The machine learning model can be trained using training data generated by collecting training sensor readings and calculating a training average positive power and a training average negative power of each stride using a force-instrumented treadmill.

The mechanical running power can be determined as a time-continuous mechanical running power.

The mechanical running power can include an average positive power and an average negative power of each stride.

The method can include receiving inertial measurement data from an inertial measurement unit; for each stride, determining a vertical velocity and an anterior-posterior velocity based on the inertial measurement data; and calculating an estimated mechanical running power using the vertical velocity, the anterior-posterior velocity, and the force values; and determining the mechanical running power by inputting the estimated mechanical running power to the machine learning model along with the force values, the slope value, the stance time value and the running speed.

The estimated mechanical running power P can be calculated according to:

$$P = v_v * \text{vGRF} + v_{ap} * \text{apGRF}$$

where $v_v$ represents the vertical velocity, $v_{ap}$ represents the anterior-posterior velocity, vGRF represents a vertical ground reaction force determined from the force values, and apGRF represents an anterior-posterior ground reaction force determined from the force values.

According to some aspects, a system for determining running power includes a plurality of force sensors positionable underfoot, one or more processors communicatively coupled to the plurality of force sensors, and a non-transitory storage memory storing a machine learning model trained to predict mechanical running power. The one or more processors are configured to: obtain a plurality of force sensor readings from the plurality of force sensors; determine force values for a plurality of strides using aggregate force data based on the force sensor readings; for each stride in the plurality of strides, determine a slope value, a stance time value, and a running speed; and determine the mechanical running power associated with the plurality of force sensor readings by inputting the force values, the slope value, the stance time value and the running speed to the machine learning model.

The system can include a wearable device on which the plurality of force sensors are disposed, and the wearable device can be worn on a foot.

The wearable device can include a deformable material.
The deformable material can be a foam.
The wearable device can be an insole.
The wearable device can be a shoe.
The wearable device can be a compression-fit garment.
The wearable device can be a sock.

The one or more processors can be further configured to output an output dataset, and the output dataset can include the mechanical running power and/or the running speed.

The one or more processors can be further configured to use the output dataset as an input to a game.

The one or more processors can be further configured to execute an action in the game based on the output dataset.

The one or more processors can be further configured to apply a scaling factor to the output dataset in the game.

The scaling factor can be an integer.

The scaling factor can have a value of 1.

The one or more processors can be further configured to generate an avatar in the game with motion defined according to the output dataset.

The one or more processors can be further configured to model the dynamics of virtual objects and surroundings with which a user interacts in the game based on the output dataset.

The one or more processors can be further configured to compute a game score in the game based on the output dataset.

The one or more processors can be further configured to generate a training goal based on the output dataset and/or the game score.

The one or more processors can be further configured to calculate a percentage of progress towards achieving the training goal based on the output data and/or the game score.

The training goal can be a range of mechanical running power values to stay within for a predetermined period of time The training goal can be a range of running speed values to stay within for a predetermined period of time.

The one or more processors can be further configured to determine a technique quality of a user performing a movement based on the output dataset.

The one or more processors can be further configured to determine a task readiness score based on the output dataset and/or the technique quality.

The one or more processors can be further configured to challenge a first user to replicate the output dataset of a second user in the game.

The system can include at least one vibrotactile motor.

The at least one vibrotactile motor can be configured to generate a haptic signal based on the output dataset.

The one or more processors can be further configured to generate an audio signal based on the output dataset.

The one or more processors can be further configured to generate a visual display based on the output dataset.

The visual display can be an output dataset vs. time graph.

The one or more processors can be configured to determine the force values to include at least one mean force value.

The aggregate force data may be separated into a plurality of foot regions and the one or more processors can be configured to determine the at least one mean force value by determining a region-specific mean force value for each foot region.

The one or more processors can be configured to determine the force values to include at least one peak force value.

The aggregate force data may be separated into a plurality of foot regions and the one or more processors can be configured to determine the at least one peak force value by determining a region-specific peak force value for each foot region.

The system can further include an inertial measurement unit associated with the plurality of force sensors and the one or more processors can be further configured to determine the slope value based on inertial measurement data received from the inertial measurement unit.

The one or more processors can be configured to identify the plurality of strides by: identifying a plurality of foot-contact times based on the force sensor readings and/or a plurality of foot-off times based on the force sensor readings; and identifying each stride as a stride period between adjacent foot-contact times or between adjacent foot-off times.

The one or more processors can be configured to, for each stride, identify the stance time value as the length of a foot contact period between the foot contact time and the foot off time.

The one or more processors can be configured to, for each stride, determine the running speed by: identifying a stride time as the length of time of the corresponding stride period; identifying a stride length for the corresponding stride period based on inertial measurement data received from an inertial measurement unit; and determining the running speed as the stride length divided by the stride time.

Each stride can include a foot contact period between the foot contact time and the foot off time and the one or more processors can be configured to identify the stride length by: determining a stride velocity based on the inertial measurement data; integrating the stride velocity over the length of time between adjacent foot contact periods to determine a stride displacement; and determining the stride length based on a combination of directional components of the stride displacement.

The inertial measurement data can include accelerometer data and the one or more processors can be configured to determine the stride velocity by: determining transformed accelerometer data by transforming the accelerometer data to a global reference frame; and determining the stride velocity by integrating the transformed accelerometer data.

The inertial measurement data can include angular velocity data and the one or more processors can be configured to transform the accelerometer data to a global reference frame by: determining a subsequent foot flat time for the subsequent stride based on the inertial measurement data; determining a foot angle by integrating the angular velocity data from the foot-contact time to the subsequent foot flat time; and transforming the accelerometer data to the global reference frame based on the foot angle.

The one or more processors can be further configured to: determine a first foot flat time for the stride based on the inertial measurement data; determine a foot flat velocity value at the first foot flat time based on the integrated transformed accelerometer data; and adjust the stride velocity by subtracting the foot flat velocity value.

The inertial measurement data can include gyroscope data and the one or more processors can be configured to determine each foot flat time by: determining a time of minimum gyroscope energy for the corresponding stride from the gyroscope data; and identifying the foot flat time as the time of minimum gyroscope energy.

The one or more processors can be configured to determine each foot flat time by identifying a time of maximal plantar force for the corresponding stride based on the force sensor readings.

The machine learning model can be a regression model.

The regression model can be a LASSO model.

The machine learning model can be trained using training data generated by collecting training sensor readings and calculating a training average positive power and a training average negative power of each stride using a force-instrumented treadmill.

The one or more processors can be configured to determine the mechanical running power as a time-continuous mechanical running power.

The one or more processors can be configured to determine the mechanical running power to include an average positive power and an average negative power of each stride.

The one or more processors can be configured to: receive inertial measurement data from an inertial measurement unit; for each stride, determine a vertical velocity and an anterior-posterior velocity based on the inertial measurement data; and calculate an estimated mechanical running power using the vertical velocity, the anterior-posterior velocity, and the force values; and determine the mechanical running power by inputting the estimated mechanical running power to the machine learning model along with the force values, the slope value, the stance time value and the running speed.

The one or more processors can be configured to calculate the estimated mechanical running power P according to:

$$P = v_v * vGRF + v_{ap} * apGRF$$

where $v_v$ represents the vertical velocity, $v_{ap}$ represents the anterior-posterior velocity, vGRF represents a vertical ground reaction force determined from the force values, and apGRF represents an anterior-posterior ground reaction force determined from the force values.

According to some aspects, there is provided a non-transitory computer readable medium storing computer-executable instructions, which, when executed by a computer processor, cause the computer processor to carry out a method of determining running power. The method includes obtaining a plurality of force sensor readings from a plurality of force sensors positioned underfoot; determining force values for a plurality of strides using aggregate force data based on the force sensor readings; for each stride in the plurality of strides, determining a slope value, a stance time value, and a running speed; determining a mechanical running power associated with the plurality of force sensor readings by inputting the force values, the slope value, the stance time value and the running speed to a machine learning model trained to predict the mechanical running power; and outputting the mechanical running power.

The non-transitory computer readable medium can store computer-executable instructions, which, when executed by a computer processor, cause the computer processor to carry out the method of determining running power, where the method is described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
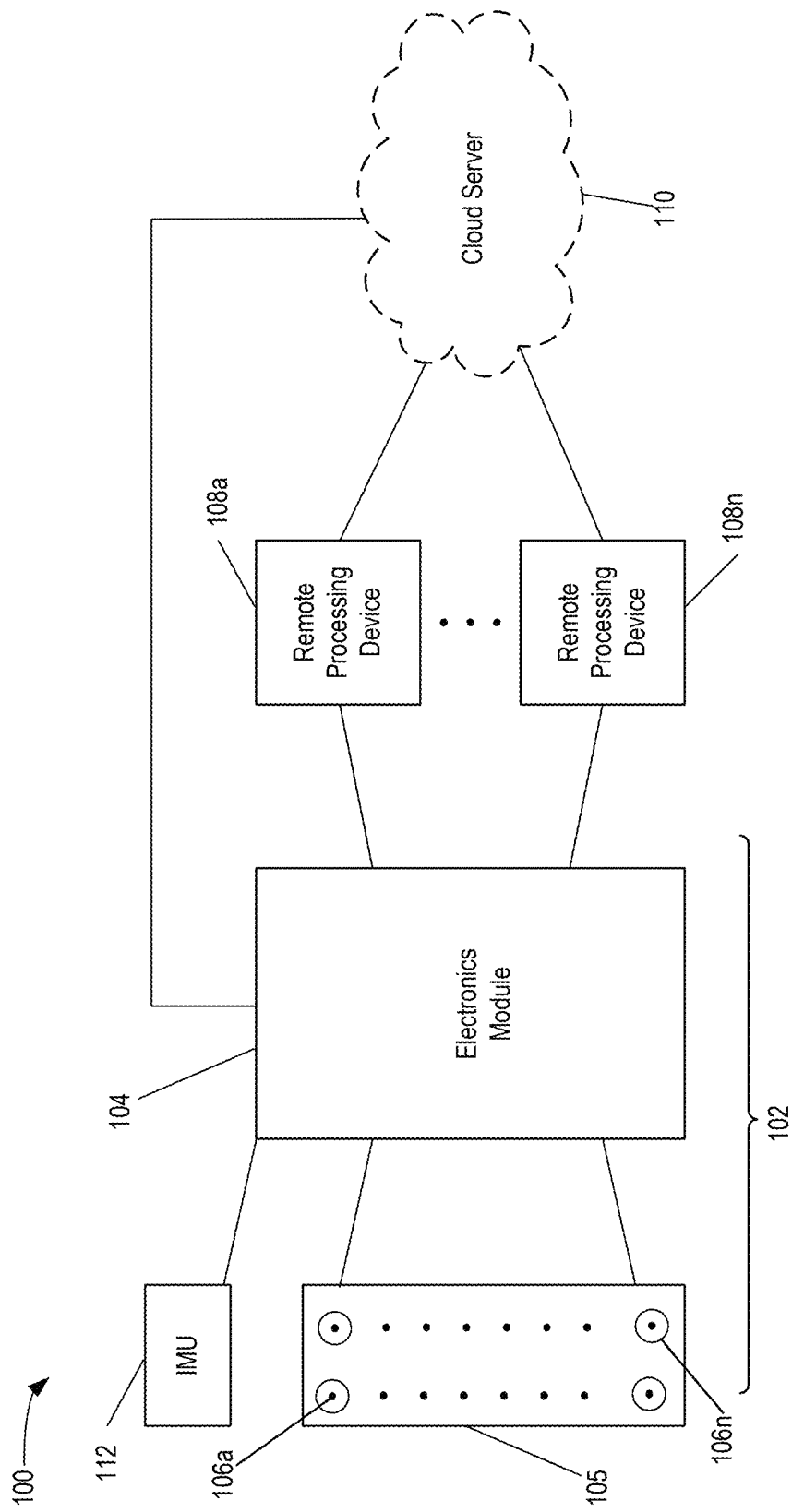
FIG. 1 is a block diagram illustrating an example of a system for determining running power.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context.

Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. Furthermore, the wording "at least one of A and B" is intended to mean only A (i.e. one or multiple of A), only B (i.e. one or multiple of B), or a combination of one or more of A and one or more of B.

Terms of degree such as "substantially", "about", and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are systems, methods and devices for determining the running power of a user while performing an activity or other movement. The systems, methods and devices described herein can determine a user's mechanical running power using a plurality of sensors positioned underfoot. The systems, methods, and devices can in some examples use sensors attached to, or contained within, wearable devices or fitness equipment to measure and monitor data relating to movement or activity of a user. The measured data from the sensors can be used to calculate the mechanical running power.

The sensors can be force sensors and can be provided in the insole of a shoe or within the footwear worn by the user. The force data acquired by the force sensors can be used to determine the level of force applied by a user's foot when walking, running, jumping, or gaming, for example. This force data can be used to derive additional force derivatives or force-based metrics, such as the force output, mean force or the peak force for the user. The force data, and other data derived therefrom, can be used to determine the mechanical running power generated by the user. This may be useful for medical, fitness, athletic, security, gaming, entertainment or other purposes.

The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object oriented programming. Accordingly, the program code may be written in any suitable programming language such as Python or C, for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The present disclosure relates in general to a system, method, and device that can be used to determine mechanical running power for a user partaking in an activity. Mechanical running power generally refers to the power output by a user as determined by the forces underfoot while the user is running. This is in contrast to metabolic running power, which is calculated by considering the metabolic cost of an activity using several factors such as wind resistance for example. Metabolic running power estimates can be inconsistent, as they vary with a user's food consumption, caffeine intake, sleep, etc. Mechanical running power, on the other hand, can provide more accurate and consistent predictions of the power output by a user.

The motion that a user goes through while running or walking is typically referred to as a gait cycle. The gait cycle generally refers to the time period between the time when a user's foot contacts the ground and the subsequent time when the same foot contacts the ground again. In some cases, the term gait cycle may also refer to the events that occur over that time period.

The term 'stride' is often used to refer to a single gait cycle for one foot. A stride can be divided into two phases: a stance phase and a swing phase. The stance phase generally refers to the period when the user's foot remains, at least partially, in contact with a surface such as the ground. The swing phase generally refers to the period when the user's foot is not in contact with the surface (e.g. as the foot swings in the air between periods when the foot is in contact with the ground).

The systems, methods and devices described herein can be used to determine mechanical running power using force sensor data from a plurality of force sensors positioned underfoot. The force sensor data can be used to determine force values for a plurality of strides. Directly measuring the force (or pressure) applied by a user using underfoot force sensors (as opposed to deriving the force data from other sensors such as accelerometers) can contribute to more accurate power calculations. As used herein, the term "force" is used broadly and can refer to raw force (i.e. with units of N), or pressure resulting from a raw force (i.e. with units of N/m2).

For each stride, a corresponding slope, stance time and running speed can be calculated. The force values, slope, stance time and running speed can be input to a machine learning model. The machine learning model can be trained to output an estimate of mechanical running power in response to receiving the force values, slope, stance time and running speed as inputs. The output from the machine learning model can be stored for review or analysis and or provided to the user as dynamic feedback on their running power output.

The systems, methods and devices described herein can also include one or more inertial measurement units (IMUs). Each IMU can be associated with a corresponding plurality of force sensors. That is, each IMU can be configured to collect inertial measurement data relating to movement of the same foot under which the force sensors are positioned.

IMU data from the one or more IMUs can be used to determine one or more inputs to the machine learning model. For example, the slope and/or the stance time and/or the running speed may be determined wholly or partially using IMU data. These IMU-derived inputs can be provided to the machine learning model in conjunction with the force sensor derived inputs in order to determine the mechanical running power for the user.

The systems, methods and devices described herein can be used to determine mechanical running power for a single foot based on sensor data acquired for that foot. The machine learning model can be trained to determine the mechanical running power for a single foot based on inputs relating to one or more strides for that foot.

Determining the mechanical running power for both feet of a user performing an activity can include providing inputs to the machine learning model for each foot. The inputs provided to the machine learning model can be determined based on sensor data acquired for each foot individually.

Determining the mechanical running power for both feet can also allow further gait metrics to be determined. For example, a bilateral power asymmetry can be calculated by comparing the mechanical running power determined for the left foot during a stride to the mechanical running power determined for the right foot during its subsequent stride (or vice versa).

The systems, methods and devices described herein can also be used to acquire sensor data for both of a user's feet at the same time. In some cases, this may require a separate plurality of force sensors for each foot (e.g. where the force sensors are incorporated into a wearable device). Alternatively, a single plurality of force sensors may be used to acquire force sensor data for both feet (e.g. where the force sensors are provided by fitness equipment).

Where an IMU is included in the system and method, a separate IMU can be provided for each foot. This allows the IMU to collect inertial measurement data relating to movement of that foot. The inertial measurement data specific to the foot can then be used to determine inputs to the machine learning model for the individual strides of that foot. Collecting separate IMU data for each foot may also allow the force sensor data to be distinguished for each foot in cases where a single plurality of force sensors are used to acquire force sensor data for both feet.

Referring now to FIG. 1, shown therein is a block diagram illustrating an example system 100 that can be used to determine mechanical running power for a user. System 100 includes a plurality of sensors positioned underfoot of a user performing an activity or other type of movement. The sensors may be provided using a wearable device and/or fitness equipment.

System 100 includes an input unit 102 (also referred to herein as an input device), one or more processing devices 108 (also referred to herein as a receiving device or an output device) and an optional remote cloud server 110. As will be described in further detail below, the input unit 102 may for example be combined with, or integrated into, a carrier unit such as a wearable device or a piece of fitness equipment.

Input unit 102 generally includes a sensing unit 105. The sensing unit 105 can include a plurality of sensors 106a-106n. The plurality of sensors 106a-106n can be configured to collect force sensor data from underneath a user's foot.

In the example shown, input unit 102 further includes an inertial measurement unit (IMU) 112. IMU 112 can include one or more sensors for measuring the position and/or motion of the wearable device. For example, IMU 112 may include sensors such as one or more of a gyroscope, accelerometer (e.g., a three-axis accelerometer), magnetometer, orientation sensor (for measuring orientation and/or changes in orientation), angular velocity sensor, and inclination sensor. Generally, IMU 112 includes at least an accelerometer. The IMU 112 also typically includes a gyroscope.

The IMU 112 can also be positioned underneath a user's foot. However, the IMU 112 need not be positioned underfoot so long as the IMU 112 can collect inertial measurement data relating to the position and/or motion of the foot.

The carrier unit can be configured to position the sensors 106 in contact with (or in close proximity to) a user's body to allow the sensors 106 to measure an aspect of the activity being performed by the user. The plurality of sensors 106a-106n may be configured to measure a particular sensed variable at a location of a user's body when the carrier unit is engaged with the user's body (e.g. when the user is wearing a wearable device containing the sensors 106 or when the user is using fitness equipment containing the sensors 106). In system 100, the plurality of sensors 106a-106n can be arranged to measure force underneath the foot (underfoot) of a user.

In some examples, the carrier unit may include one or more wearable devices. The wearable devices can be manufactured of various materials such as fabric, cloth, polymer, or foam materials suitable for being worn close to, or in contact with, a user's skin. All or a portion of the wearable device may be made of breathable materials to increase comfort while a user is performing an activity.

In some examples, the wearable device may be formed into a garment or form of apparel such as a sock, a shoe, or an insole. Some wearable devices such as socks may be in direct contact with a user's skin. Some wearable devices, such as shoes, may not be in direct contact with a user's skin but still positioned within sufficient proximity to a user's body to allow the sensors to acquire the desired readings.

In some cases, the wearable device may be a compression-fit garment. The compression-fit garment may be manufactured from a material that is compressive. A compression-fit garment may minimize the impact from "motion artifacts" by reducing the relative movement of the wearable device with respect to a target location on the user's body. In some cases, the wearable device may also include anti-slip components on the skin-facing surface. For example, a silicone grip may be provided on the skin-facing surface of the wearable device to further reduce the potential for motion artifacts.

The wearable device can be worn on a foot. For example, the wearable device may be a shoe, a sock, or an insole, or a portion of a shoe, a sock, or an insole. The wearable device may include a deformable material, such as foam. This may be particularly useful where the wearable device is a shoe or insole.

The plurality of sensors 106a-106n can be positioned to acquire sensor readings from specified locations on a user's body (via the arrangement of the sensors on the carrier unit). The sensors 106 can be integrated into the material of the carrier unit (e.g. integrated into a wearable device or fitness equipment). Alternatively, the sensors 106 can be affixed or attached to the carrier unit, e.g. printed, glued, laminated or ironed onto a surface, or between layers, of a wearable device or fitness equipment.

In some examples, the carrier unit may include fitness equipment. The fitness equipment may include various types of fitness equipment on which a user can exert force with their foot while performing an activity. For example, the carrier unit may be fitness equipment such as an exercise mat or a treadmill (e.g. a force-instrumented treadmill).

For clarity, the below description relates to a carrier unit in the form of an insole. The insole carrier unit may be provided in various forms, such as an insert for footwear, or integrated into a shoe. However, other carrier units may be implemented using the systems and methods described herein, such as the wearable devices and fitness equipment described above. Incorporating the sensing unit 105 (and optionally the IMU 112) into a carrier unit in the form of a wearable device may be desirable as it allows running power to be determined for a user at various locations and without requiring specifically configured fitness equipment.

The below description relates to an insole in which the plurality of sensors 106 are force sensors. Various types of force sensors may be used, such as force sensing resistors (also referred to as "sensels" or sensing elements), pressure sensors, piezoelectric tactile sensors, elasto-resistive sensors, capacitive sensors or more generally any type of force sensor that can be integrated into a wearable device or fitness equipment capable of collecting force data underfoot.

The plurality of sensors 106 may be arranged into a sensor array. As used herein, the term sensor array refers to a series of sensors arranged in a defined grid. The plurality of sensors 106 can be arranged in various types of sensor arrays. For example, the plurality of sensors 106 can be provided as a set of discrete sensors (see e.g. FIG. 2). A discrete sensor is an individual sensor that acquires a sensor reading at a single location. A set of discrete sensors generally refers to multiple discrete sensors that are arranged in a spaced apart relationship in a sensing unit.

Sensors 106a-106n may be arranged in a sparse array of discrete sensors that includes void locations where no sensors 106 are located. Alternatively, sensors 106a-106n may be arranged in a continuous or dense sensor array in which sensors 106 are arranged in a continuous, or substantially continuous manner, across the grid.

Discrete sensors can provide an inexpensive alternative to dense sensor arrays for many applications. However, because no sensors are positioned in the interstitial locations between the discrete sensors and the void locations external to the set of discrete sensors, no actual sensors readings can be acquired for these locations. Accordingly, depending on the desired resolution for the force sensor data, sensor readings may be estimated (rather than measured) at the interstitial locations and at the void locations external to the set of discrete sensors in order to provide sensor data with similar resolution to a dense sensor array. Alternatively, where lower resolution force sensor data is sufficient, sensor readings may not necessarily be estimated.

Various interpolation and extrapolation techniques may be used to estimate sensor values at interstitial locations and external void locations. In some cases, sensor values may be estimated using methods for synthesizing sensor data.

According to some aspects, a method for synthesizing sensor data can include: obtaining a plurality of sensor readings from a corresponding plurality of sensors, the plurality of sensors arranged in a first predetermined pattern, wherein the first predetermined pattern maps each of the plurality of sensors to respective locations on a wearable device; and based on the plurality of sensor readings and a plurality of estimation weights, estimating a plurality of synthesized sensor readings for a corresponding plurality of synthesized sensors, the plurality of synthesized sensors arranged in a second predetermined pattern, wherein the second predetermined pattern maps each of the plurality of synthesized sensors to respective locations on the wearable device.

The plurality of estimation weights can be predetermined in a preprocessing phase, and the preprocessing phase can include: obtaining training data, the training data including a plurality of sets of physical sensor readings from physical sensors arranged according to both the first and second predetermined patterns; filtering the training data to obtain filtered training data; using the filtered training data, computing an average sensor reading for each physical sensor to produce an input data set and a reference data set, the input data set including average sensor readings for sensors corresponding to the first predetermined pattern, the reference data set including average sensor readings for sensors corresponding to the second predetermined pattern; and optimizing the estimation weights.

Optimizing the estimation weights can include: initially estimating the estimation weights; computing estimated sensor values based on the input data set and the estimation weights; and performing gradient descent optimization to update the estimation weights, where the gradient descent optimization compares error between the estimated sensor values and the reference data set.

Filtering the training data can include resizing each instance of the training data to a common size. Filtering the training data can also include: dividing the training data into stance data and swing data; and resizing each instance in the set of stance data to a common size.

The plurality of sensor readings can be associated with an activity, and the plurality of synthesized sensor readings can be estimated when the activity is an activity requiring more sensors than can be provided by the plurality of sensors in the first predetermined pattern. The activity can be running, jogging, walking, or cycling.

The method can include predetermining and optimizing estimation weights associated with a specific activity.

The first predetermined pattern can include at least 32 locations.

The first predetermined pattern can include sensors arranged in a 2-3-4-4-4-3 arrangement in a forefoot portion. The first predetermined pattern can include sensors arranged in a 1-1-1 arrangement in a midfoot portion. The first predetermined pattern can include sensors arranged in a 2-1-2-1-2-1 arrangement in a heel portion.

The second predetermined pattern can include at least 32 locations. The second predetermined pattern can include at least 68 locations.

System 100 can be configured to implement a method of determining mechanical running power. The method of determining mechanical running power may be implemented using a controller of the input device 102, a remote processing device 108, or cloud server 110.

As shown in FIG. 1, input unit 102 includes an electronics module 104 coupled to the plurality of sensors 106 and to optional IMU 112. In some cases, the electronics module 104 can include a power supply, a controller, a memory, a signal acquisition unit operatively coupled to the controller and to the plurality of sensors 106 (and to IMU 112), and a wireless communication module operatively coupled to the controller.

Generally, the sensing unit refers to the plurality of sensors 106 and the signal acquisition unit. The signal acquisition unit may provide initial analog processing of signals acquired using the sensors 106, such as amplification. The signal acquisition unit may also include an analog-to-digital converter to convert the acquired signals from the continuous time domain to a discrete time domain. The analog-to-digital converter may then provide the digitized data to the controller for further analysis or for communication to a remote processing device 108 or remote cloud server 110 for further analysis.

Optionally, the electronics module 104 may include a controller or other processing device configured to perform the signal processing and analysis. In such cases, the controller on the electronics module may be configured to process the received sensor readings in order to determine synthesized sensor readings. In some cases, the controller may be coupled to the communication module (and thereby the sensing unit) using a wired connection such as Universal Serial Bus (USB) or other port.

The electronics module 104 can be communicatively coupled to one or more remote processing devices 108a-108n, e.g. using a wireless communication module (e.g., Bluetooth, Bluetooth Low-Energy, WIFI, ANT+IEEE 802.11, etc.). The remote processing devices 108 can be any type of processing device such as (but not limited to) a personal computer, a tablet, and a mobile device such as a smartphone, a smartwatch or a wristband. The electronics modules 104 can also be communicatively coupled to remote cloud server 110 over, for example, a wide area network such as the Internet.

Each remote processing device 108 and optional remote cloud server 110 typically includes a processing unit, an output device (such as a display, speaker, and/or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit, and a memory unit. The memory unit can include RAM, ROM, one or more hard drives, one or more flash drives or some other suitable data storage elements such as disk drives, etc.

The processing unit controls the operation of the remote processing device 108 or the remote cloud server 110 and can be any suitable processor, controller or digital signal processor that can provide sufficient processing power processor depending on the desired configuration, purposes and requirements of the system 100.

The display can be any suitable display that provides visual information. For instance, the display can be a cathode ray tube, or a flat-screen monitor and the like if the remote processing device 108 or remote cloud server 110 is a desktop computer. In other cases, the display can be a display suitable for a laptop, tablet or handheld device, such as an LCD-based display and the like.

System 100 can generally be used for determining running power based on sensor readings received from a plurality of sensors positioned underfoot. In some cases, system 100 may also track additional data derived from the sensor readings. The sensor readings, running power data, and derived data may be monitored, stored, and analyzed for the user. Aspects of the monitoring, storage and analysis of biometric features and other metrics may be performed by one or more of the input unit 102, and/or a remote processing device 108, and/or the cloud server 110. For example, a non-transitory storage memory of one or more of the input unit 102, and/or a remote processing device 108, and/or the cloud server 110 can store a machine learning model trained to predict mechanical running power.

A remote cloud server 110 may provide additional processing resources not available on the input unit 102 or the remote processing device 108. For example, some aspects of processing the sensor readings acquired by the sensors 106 may be delegated to the cloud server 110 to conserve power resources on the input unit 102 or remote processing device 108. In some cases, the cloud server 110, input unit 102 and remote processing device 108 may communicate in real-time to provide timely feedback to a user regarding the sensor readings, running power data, and other related data.

In the example system 100 illustrated in FIG. 1, a single input unit 102 is shown. However, system 100 may include multiple input units 102 associated with the same user. For example, system 100 may include two separate input units 102, each input unit 102 associated with one of the user's legs. Sensor data from an individual input unit 102 may be used to determine the mechanical running power for the user's corresponding leg.

In some examples, system 100 may include a separate sensing unit 105 (and optionally a separate IMU 112) for each foot of a user. This may allow the mechanical running power to be determined separately for each of the user's feet.

Alternatively, a single sensing unit 105 may be used to acquire force sensor data for both feet of a user. This may be the case where the sensing unit 105 is incorporated into fitness equipment such as an exercise mat or treadmill. In such cases, the force sensor data acquired by the sensing unit 105 may be associated with individual feet through further processing by electronics module 104 and/or processing device 108.

The IMU 112 is associated with a single foot. Accordingly, separate IMUs 112 may be provided for both feet. IMU data acquired by the IMU 112 associated with each foot may be used to associate the force sensor data acquired by a single sensing unit 105 with the corresponding foot.

Certain hardware and software features of the system may be enabled, disabled, or changed. For example, a user may enable or disable certain sensors 106. Enabling or disabling certain features may be desirable if the user has a foot condition which inhibits them from activating certain sensors, such as a broken or missing toe. Sampling rate may also be modifiable. Sampling rate may be modified to minimize processing time and to save memory, or to increase data output to gain deeper insights. The location of processing (the input unit 102, the remote processing device 108, or the cloud server 110) may also be changed. If additional sensors are included in the wearable device (e.g. IMU, temperature sensors, and/or GPS), certain sensor types may be enabled or disabled. For example, a GPS system can be disabled to conserve battery power of a carrier unit, if a user operates the carrier unit while running on a treadmill at home.

Figure 2:
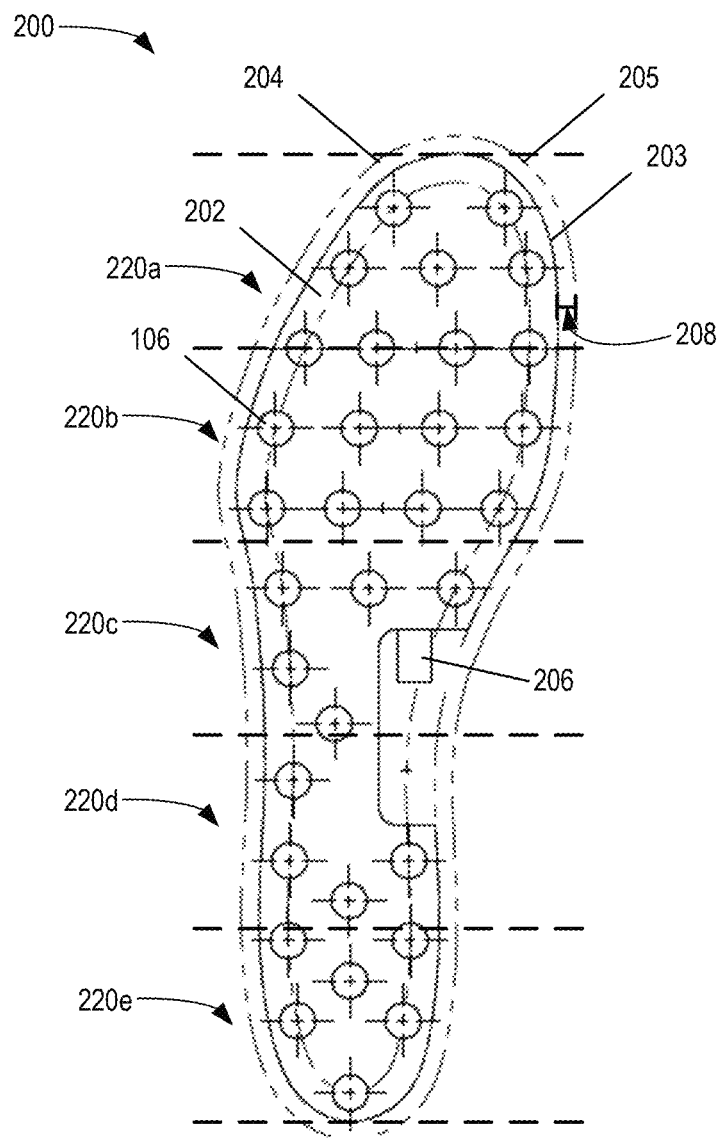
FIG. 2 is a diagram illustrating an example of a wearable device incorporating a sensing unit that can be used in the system of FIG. 1.

Referring now to FIG. 2, shown therein is an example of an insole 200 that includes a sensing unit 202. The insole 200 is an example of an input device 102 that may be used in the system 100 shown in FIG. 1. The insole 200 may be the footwear insert described in PCT Application No. PCT/CA2020/051520 published on May 20, 2021, which is incorporated herein by reference. The insole 200 may be an Orpyx SI® Sensory Insole sold by Orpyx Medical Technologies Inc.

The insole 200 includes a sensor unit 202 and an optional liner 204. The liner 204 can provide a protective surface between the sensor unit 202 and a user's foot. The liner 204 may have a slightly larger profile as compared to the sensor unit 202. That is, the outer perimeter 203 of the sensor unit 202 may be inwardly spaced from the outer perimeter 205 of the liner 204 by an offset 208. The offset 208 may be substantially consistent throughout the perimeter of the sensor unit 202 such that the sensor unit 202 is completely covered by the liner 204.

Optionally, the sensor unit 202 can include an IMU (not shown). The sensor unit 202 can also include a connector 206. The connector 206 may provide a coupling interface between the plurality of sensors 106 (and the optional inertial measurement unit) and an electronics module (not shown) such as electronics module 104. The coupling interface can allow signals from the sensors 106 and/or IMU to be transmitted to the electronics module. In some cases, the coupling interface may also provide control or sampling signals from the electronics module to the sensors 106 and/or IMU.

Optionally, the sensor unit 202 can also include one or more temperature sensors (not shown) and/or a GPS system (not shown).

The arrangement of sensors 106 in the sensor unit 202 is an example of a sparse sensor array that may be used to collect force sensor data. In alternative examples, various different types of force sensors, force sensor arrays, and arrangements of force sensors may be used. For example, sensor units containing a dense force sensor array (e.g. a Pedar® insole or Tekscan® system) may also be used.

Figure 3:
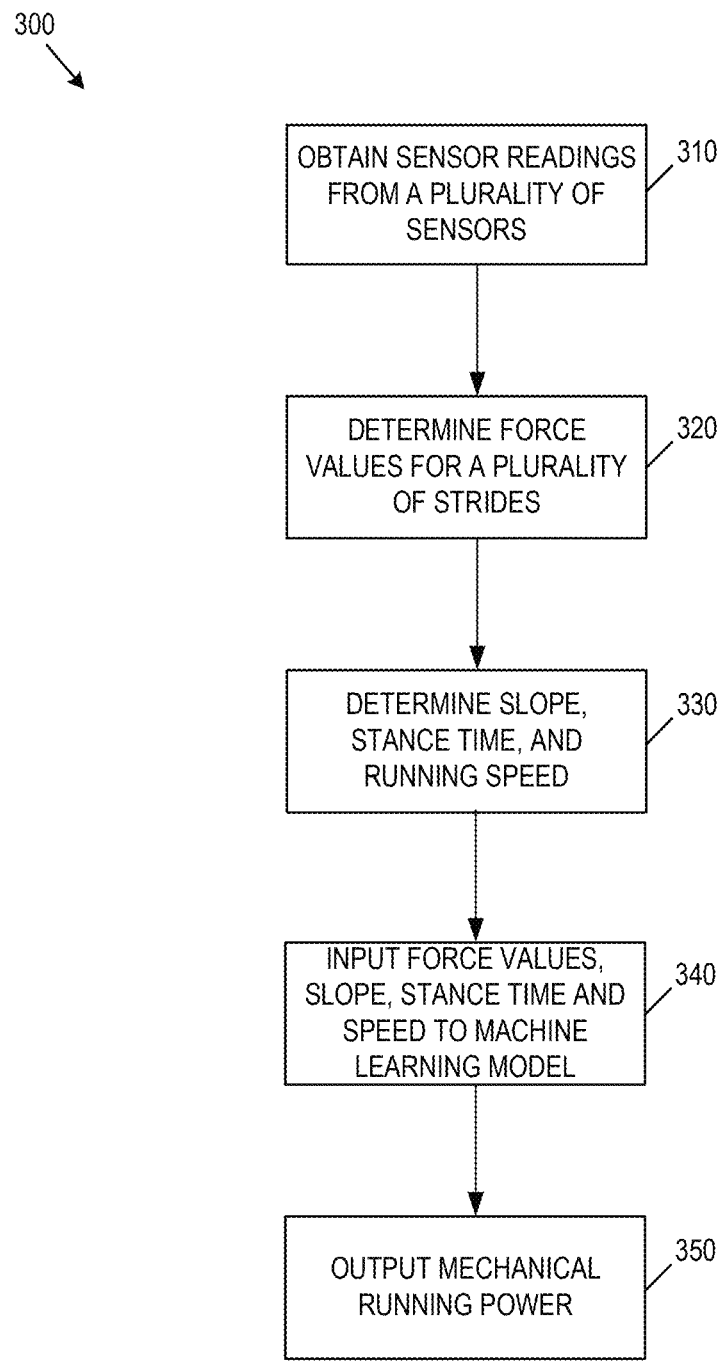
FIG. 3 is a flowchart illustrating an example of a method for determining mechanical running power.

Referring now to FIG. 3, shown therein is an example method 300 for determining running power using force sensor data from a plurality of force sensors positioned underfoot. The method 300 may be used with a plurality of sensors configured to measure human movement or human activity, such as sensors 106. Method 300 is an example of a method for determining running power in which a machine learning model is used to determine the running power based on sensor readings acquired from the plurality of force sensors.

At 310, a plurality of sensor readings can be obtained from a corresponding plurality of sensors. The plurality of sensors can be positioned underfoot (i.e. underneath the foot) of a user performing a physical activity. The plurality of sensors can include a plurality of force sensors configured to acquire force sensor data.

The force sensors can be positioned at specified locations on a carrier unit such as a wearable device or a piece of equipment. The force sensors can be configured to measure force data relating to human activity. As shown in FIG. 2, the plurality of sensors may be force sensors provided at various locations of an insole. The force sensors can measure force applied to the insole during physical activities, such as walking, running, jumping, or gaming.

The plurality of sensors may also include one or more IMUs. Accordingly, the plurality of sensor readings acquired at 310 can include IMU sensor data received from the one or more IMUs.

Each inertial measurement unit (IMU) can be associated with the plurality of force sensors. For example, the IMU may be incorporated into the same wearable device as the plurality of force sensors. More generally, the IMU can be configured to collect IMU sensor data about a single foot of a user. This IMU sensor data can be acquired for the same foot for which the sensor readings were obtained from the plurality of force sensors.

The sensor readings acquired at 310 may be acquired as a time-continuous set of sensor readings. This may provide a time-continuous set of sensor data that can be used to determine the mechanical running power as a time-continuous running power and/or an average power value for each stride. Depending on the nature of the sensors and the signal preprocessing performed, the time-continuous sensor data may be discretized, e.g. using an analog to digital conversion process. Even where the sensor data is discretized, the set of sensor data may allow the mechanical running power to be determined as a (discretized) time-continuous running power and/or an average power value for each stride.

The sensor readings may be acquired over the course of a plurality of strides taken by a user. The sensor readings can be used to determine various data associated with individual strides.

The plurality of strides can be identified using data from the sensor readings. Each stride may be identified based on times when the user's foot first contacts the ground (a foot-contact time) and/or times when the user's foot leaves the ground (a foot-off time).

Each stride can be defined to correspond to a stride period. The stride period generally refers to the time period over which a single gait cycle extends. The endpoints of the stride period may vary in different implementations of method 300. For example, the stride period can be defined as the length of time between adjacent foot-contact times. Alternatively, the stride period can be defined as the length of time between adjacent foot-off times.

A plurality of foot-contact times can be determined based on the sensor readings. As noted above, the plurality of foot-contact times may be used to determine the stride period for each stride as the time between adjacent foot-contact times. Various techniques may be used to identify the foot-contact time. For example, the foot-contact times can be determined using the force sensor readings acquired from the plurality of force sensors.

Alternatively or in addition, a plurality of foot-off times can be determined based on the sensor readings. As noted above, the plurality of foot-off times may be used to determine the stride period for each stride as the time between adjacent foot-off times. Various techniques may be used to identify the foot-off time. For example, the foot-off times can be determined using the force sensor readings acquired from the plurality of force sensors.

According to some aspects, a method for determining a foot-contact time and a foot-off time from a plurality of force sensors positioned underfoot can include: obtaining a sensor signal dataset based on sensor readings from the plurality of force sensors during a first time period, wherein the sensor signal dataset defines a series of signal values extending over the first time period; based on the series of signal values, identifying a pair of interstride interval periods within the first time period, the pair of interstride interval periods including a foot contact interstride interval and a foot off interstride interval, wherein each interstride interval includes a subset of signal values from the series of signal values; identifying a foot-contact time by identifying an inflection point in the subset of signal values corresponding to the foot contact interstride interval; and identifying a foot-off time by identifying an inflection point in the subset of signal values corresponding to the foot off interstride interval.

The method can further include identifying a foot contact period as a time period extending between the foot-contact time and foot-off time identified for the pair of interstride intervals, and outputting the foot contact period.

For each interstride interval, identifying the inflection point in the corresponding subset of signal values can include: identifying a threshold crossing value in the subset of signal values for that interstride interval; dividing the interstride interval into a plurality of segments; identifying a transition signal value in the subset of signal values for that interstride interval, where the transition signal value is identified at a transition point between adjacent segments in the plurality of segments; tracing a unity line between the threshold crossing value and the transition signal value, the unity line identifying a series of unity line values within the interstride interval; and identifying the inflection point as a point of maximum difference between the unity line values and the subset of signal values.

The foot contact interstride interval can be identified by: identifying a pair of subsequent positive threshold crossings in the series of signal values, where each positive threshold crossing is identified as a point in the first time period where the series of signal values is increasing and crosses a specified threshold value; and defining the foot contact interstride interval as a first interstride period extending between the pair of subsequent positive threshold crossings.

The threshold crossing value for the foot contact interstride interval can be identified at the second positive threshold crossing in the pair of subsequent positive threshold crossings.

The transition signal value for the foot contact interstride interval can be identified at the transition point at the beginning of the last segment in the plurality of segments.

The foot off interstride interval can be identified by: identifying a pair of subsequent negative threshold crossings in the series of signal values, where each negative threshold crossing is identified as a location in the first time period where the series of signal values is decreasing and crosses a specified threshold value; and defining the foot off interstride interval as a second interstride period extending between the pair of subsequent negative threshold crossings.

The threshold crossing value for the foot off interstride interval can be identified at the first negative threshold crossing in the pair of subsequent negative threshold crossings.

The transition signal value for the foot off interstride interval can be identified at the transition point located at the end of the first segment in the plurality of segments.

The method can include classifying the sensor signal dataset as a running dataset or a walking dataset based on the series of signal values; and determining a number of segments in the plurality of segments based on the classification of the sensor signal dataset. In response to classifying the sensor signal dataset as a running dataset, the number of segments can be determined to be 3 segments.

The specified threshold value can be defined as 50% of the maximum signal value. The first time period can be at least 5 seconds.

The method can include filtering the sensor signal dataset prior to identifying the pair of interstride intervals. The filtering can include applying a low-pass filter to the sensor signal dataset.

The method can include classifying the sensor signal dataset as a running dataset or a walking dataset prior to filtering the data.

The method can include identifying a plurality of foot contact periods using a rolling window as the first time period.

The method can include calculating one or more temporal gait metrics using the series of signal values corresponding to the plurality of foot contact periods.

At 320, force values can be determined from the sensor readings acquired at 310. The force values can be determined for a plurality of strides. Separate force values may be determined for each stride in the plurality of strides.

As explained above, the plurality of strides may be identified based on corresponding stride periods. Force values may be determined for each stride based on the sensor readings acquired at 310 relating to the corresponding stride period.

The force values may be determined based on aggregate force data for the corresponding stride. The sensor readings may include corresponding force sensor values from each of the force sensors in the plurality of force sensors. The sensor readings may include a plurality of corresponding force sensor values from each of the force sensors in the plurality of force sensors at various time points throughout the time period (e.g. as time-continuous sensor readings or sensor readings at discrete time steps). The aggregate force data may be determined based on the sensor values received from multiple force sensors in the plurality of force sensors over the stride period.

Determining the force values can include determining at least one mean force value. Each mean force value can be determined as the arithmetic mean of the sensor values received from multiple force sensors.

A single mean force value can be determined for the entire stride period. Determining the single mean force value may include calculating an arithmetic mean across multiple sensor values received from each force sensor. This may be the case where, for example, the machine learning model is configured to determine an average running power for the entire stride period.

Alternatively or in addition, a separate mean force value may be determined for each time (or time step) in the stride period. Determining the mean force value for each time may include calculating an arithmetic mean across the sensor values received from each force sensor at that time. This may be the case where, for example, the machine learning model is configured to determine a time-continuous running or where the machine learning model is configured to determine an average running power for the entire stride period.

Alternatively or in addition, determining the force values can include determining at least one peak force value. Each peak force value can be determined as the peak or greatest value of the sensor values received from multiple force sensors.

A single peak force value can be determined for the entire stride period. Determining the single peak force value may include determining the peak or greatest value across multiple sensor values received from each force sensor. This may be the case where, for example, the machine learning model is configured to determine an average running power for the entire stride period.

Alternatively or in addition, a separate peak force value may be determined for each time (or time step) in the stride period. Determining the peak force value for each time may include determining the peak or greatest value across the sensor values received from each force sensor at that time. This may be the case where, for example, the machine learning model is configured to determine a time-continuous running power or where the machine learning model is configured to determine an average running power for the entire stride period.

The aggregate force data may be determined based on the sensor values from all of the force sensors in the plurality of force sensors. Thus, the corresponding aggregate force values (e.g. mean force value and/or peak force value) may be determined for the entire sensor array.

Alternatively, the aggregate force data can be separated into a plurality of foot regions 220 (see e.g. FIG. 2). Each force sensor 106 in the plurality of force sensors can be assigned to a corresponding foot region 220. The aggregate force data for each foot region 220 can then be determined based on the sensor readings from the force sensors 106 corresponding to that foot region 220.

The sensor unit can be separated into a plurality of foot regions in various different ways. In the example shown in FIG. 2, the sensing unit 200 has been separated into five different foot regions 220a-220e in the anterior-posterior direction. However, the number and configuration of foot regions can vary.

If the aggregate force data is separated into a plurality of foot regions, the force values may be determined as region-specific force values. Accordingly, determining the at least one mean force value can include determining a region-specific mean force value for each foot region. Similarly, determining the at least one peak force value can include determining a region-specific peak force value for each foot region.

At 330, a slope value, stance time value and running speed value can be determined for each stride. The slope value, stance time value and running speed value may be determined using the sensor readings acquired at 310. Alternatively or in addition, some of the slope value, stance time value and running speed value may be determined based on data acquired from external devices, such as a treadmill on which a user is running.

Determining the slope value may allow the mechanical running power to be determined for a user over a variety of slopes/inclines. The slope value may be determined in various ways. For example, where a user is running or walking on a treadmill, the slope value may be determined based on the incline setting of the treadmill. The incline setting of the treadmill may be determined automatically, e.g. by connecting a processing device 108 to the treadmill using a wired or wireless communication interface and accessing the incline setting through the connection (e.g. through an application distributed in association with the treadmill). Alternatively, the incline setting may be input by a user, e.g. through an application running on processing device 108.

Alternatively, the slope value may be determined based on inertial measurement data received from an inertial measurement unit. The inertial measurement unit may be provided by an input unit 102 worn by a user (e.g. as part of a wearable device in the form of a sock, shoe or insole).

The slope value may be determined from the inertial measurement data in various ways. For example, the slope value may be determined by estimating a step height value for each stride. The step height may be determined by integrating the stride velocity (determined from the inertial measurement data) over the corresponding stride period. The result of the integration provides a stride displacement that includes components in each of the x, y, and z directions. The vertical component $\Delta d_z$ and horizontal component $\Delta d_y$ of the stride displacement may be used to determine the slope value $\theta$ according to:

$$\tan\theta = \frac{\Delta d_z}{\Delta d_y}$$

Determining the slope value by estimating a step height value may be particularly desirable for users who are moving at lower speeds (e.g. walking).

Alternatively, the slope value may be determined by estimating a gravity vector value associated with the stride. A foot flat time can be identified for the stride. The direction of the gravity vector can be determined from the inertial measurement data. The direction of the gravity vector at the foot flat time can then be used to determine the slope value.

Determining the slope value based on the gravity vector value can include an initial calibration process in which the inertial measurement data is calibrated with the user's foot on flat ground. The difference in orientation between the gravity vector during the IMU calibration and the gravity vector at the foot flat time during the stride can then be used to determine the slope value.

The method for determining the slope value may be selected based on user-specific calibration data provided to a processing device 108. In some cases, the method used to determine the slope value may be selected based on the foot strike pattern for a given user.

Certain foot strike patterns may make it more difficult to determine the foot flat time. For example, forefoot strike runners may not go through a foot flat time during a stride. In such cases, determining the slope value based on a gravity vector value may be less accurate. Accordingly, an alternative method of determining the slope value may be selected for users identified as forefoot strike runners.

Alternatively or in addition, the slope value may be determined based on force sensor data from the plurality of force sensors. For example, heel-strike runners experience less force in the heel region while running uphill as compared to running on flat ground. Accordingly, changes in the slope value may be determined by identifying trends in the force values. The changes in the slope value may be used to determine the slope value, for instance based on an initial calibration when running on flat ground. For example, the slope value may be determined using a machine learning model trained using known slope values (e.g. from training data acquired while a user is running on a treadmill) and force values for a user wearing insoles equipped with force sensors.

The stance time value for each stride can be identified as the length of the corresponding stance phase. As noted above, the stance phase refers to the period during which a user's foot remains (at least partially) in contact with the ground. Accordingly, the stance time value can be identified as the length of a foot contact period between the foot contact time (for that stride) and the foot off time (for that stride).

As noted above, various techniques may be used to identify the foot contact time and the foot-off time.

The running speed value may be determined in various ways. For example, where a user is running or walking on a treadmill, the running speed value may be determined based on the speed setting of the treadmill.

Alternatively, the running speed value may be determined based on sensor data received at 310. For each stride, the running speed may be determined based on a stride time and a stride length of the stride period corresponding to that stride. The stride time and stride length may be determined using the sensor data acquired at 310. An example process 400 for determining the running speed using sensor data is described in further detail herein below with reference to FIG. 4.

At 340, the force values (from 320) and the slope value, stance time value and running speed value (from 330) can be input to a machine learning model. The machine learning model can be trained to predict the mechanical running power in response to receiving the force values, slope value, stance time value, and running speed value as inputs. Accordingly, the mechanical running power associated with the plurality of sensor readings can be determined by the machine learning model.

The mechanical running power may be defined in various ways. For example, the mechanical running power may be defined to include an average positive power and an average negative power for each stride. Positive running power generally refers to the portion of running power that is propulsive (at the end of the stance phase). Negative running power generally refers to the portion of running power that is absorptive (at the start of the stance phase). The machine learning model can be trained to output the average positive power and the average negative power for each stride based on the force values, slope value, stance time value, and running speed value determined for the entire stride.

Alternatively or in addition, the mechanical running power can be determined as a time-continuous mechanical running power. The time-continuous mechanical running power may be defined using a fully continuous time scale or a discretized time scale that includes time steps.

The machine learning model can be trained to output the time-continuous running power based on the force values, slope value, stance time value, and running speed value corresponding to each point in time or time step within a given stride. This may provide more granular data for feedback and analysis with the trade-off of requiring increased computational expense. In such cases, the force values can be determined as time-continuous force values that are input to the machine learning model.

Various different types of machine learning models may be used to determine the mechanical running power. A regression model can be used as the machine learning model. For example, the regression model may be a LASSO model. This can provide a computationally inexpensive method of determining the mechanical running power, which may be particularly beneficial in providing real-time, or near real-time, feedback to the user.

Alternatively, a different type of machine learning could be used to determine the mechanical running power, such as, for example a neural network, a gradient boosted decision tree, and so on.

The machine learning model can be trained using training data that includes the set of inputs (e.g. the force values, slope value, running speed value and stance time value) determined from sensor data. The inputs can be determined based on training sensor readings from a plurality of force sensors positioned underfoot and an IMU (as at 310) and preprocessing of the training sensor readings as described at steps 320 and 330 above (and FIG. 4 below).

The training data can also include measured data representing the force output by a user. The measured data can be defined as desired outputs for the machine learning model. For example, a training mechanical running power can be determined using a force-instrumented treadmill. A force-instrumented treadmill can include force plates that allow the average power to be computed using a physics-based approach (as described in the Examples section below). The treadmill also allows the running speed to be known from the operating settings of the treadmill while the training data is collected (which may be used to evaluate a method of determining the running speed, such as method 400 described herein below).

The training data can be collected from one or more users performing an activity. Once the machine learning model is trained using the training data, the machine learning model can be applied to determine the mechanical running power of the same or different users performing an activity.

The training process may vary depending on the type of machine learning model being implemented. For example, with a LASSO regression model, an optimization algorithm can be applied to optimize the LASSO regression coefficients. The optimization algorithm may employ a cost function based on the difference between the desired outputs (as calculated from the treadmill force data) and the model outputs calculated from the given inputs. The trained model can then be used, as at 340, to determine the mechanical running power based on preprocessed data from the plurality of force sensors (and the IMU).

Different combinations of input data may be used to train and implement the machine learning model. For example, the machine learning model may be trained to receive 13 inputs, namely a running speed value, a slope value, a stance time value, five peak force values (e.g. one for each region 220) and five mean force values (e.g. one for each region 220).

Alternatively, a different number of inputs may be used. For example, a different number of inputs may be used when the foot is segmented into a different number of regions 220. Alternatively or in addition, a different number of inputs can be used where additional inputs (e.g. acceleration, estimated mechanical running power) are included in addition to the example inputs described herein above.

For example, an estimated mechanical running power may be calculated directly based on the sensor readings from the force sensors and an IMU. The estimated mechanical running power may be calculated as an average estimated mechanical power value for the stride. The average estimated mechanical power can include separate values for the average estimated positive power and the average estimated negative power for a given stride. Each estimated mechanical running power value can be provided to the machine learning model as an additional input (e.g. along with the running speed value, slope value, stance time value, and force values).

An estimated mechanical running power signal can be calculated according to:

$$P = v_v * vGRF + v_{ap} * apGRF$$

where $v_v$ represents the vertical velocity as calculated from the sensor data acquired at 310 (e.g. the insole IMU data and force sensor data), $v_{ap}$ represents the anterior-posterior velocity as calculated from the sensor data acquired at 310 (e.g. the insole IMU data and force sensor data), vGRF represents the vertical ground reaction force as calculated from the insole sensor data using a recurrent neural network with force, speed, and slope inputs, and apGRF represents the anterior-posterior ground reaction force as calculated from the insoles using a recurrent neural network with force, speed, and slope inputs. The average estimated positive power and the average estimated negative power can then be determined from the estimated mechanical running power signal.

The average estimated positive power ($P_{avg}^{+ii}$) for a stride can be determined by integrating only the positive position of the estimated mechanical running power signal for that stride, and then dividing the integration result by the length ($t^{+ii}$) of the positive portion of the estimated mechanical running power signal. In equation form, the average estimated positive power for a stride can be determined according to:

$$P_{avg}^{t^+ + x \int p^+ dt} \frac{+1}{}$$

Similarly, the average estimated negative power ($P_{avg}^-$) for a stride can be determined by integrating only the negative position of the estimated mechanical running power signal for that stride, and then dividing the integration result by the length ($t^-$) of the negative portion of the estimated mechanical running power signal. In equation form, the average estimated negative power for a stride can be determined according to:

$$P_{avg}^{t^- - x \int p^- dt} \frac{-1}{}$$

The estimated mechanical running power can be calculated based on the force values and components of the stride velocity. For instance, a vertical velocity component and an anterior-posterior velocity component can be used to calculate the estimated mechanical running power. A vertical velocity and an anterior-posterior velocity can be determined for each stride based on the inertial measurement data. The velocity components can be determined based on the inertial measurement data received from the IMU and the force sensor data received from the force sensors, for instance as described herein below at step 430 of method 400.

The estimated mechanical running power can be calculated using a vertical ground reaction force and an anterior-posterior ground reaction force determined from the force values. For example, the estimated mechanical running power can be calculated according to:

$$P = v_v * vGRF + v_{ap} * apGRF$$

where $v_v$ represents the vertical velocity, $v_{ap}$ represents the anterior-posterior velocity, vGRF represents a vertical ground reaction force determined from the force values, and apGRF represents an anterior-posterior ground reaction force determined from the force values.

The vertical ground reaction force and anterior-posterior ground reaction force can be calculated from the force sensor data in various ways. For example, the force sensor data can be provided as an input to a machine learning model configured to output the vertical ground reaction force and anterior-posterior ground reaction force. Additional inputs may also be provided to the machine learning model in order to determine the vertical ground reaction force and anterior-posterior ground reaction force, such as user mass, user speed, and user slope for example. Methods for determining the vertical ground reaction force and anterior-posterior ground reaction force may utilize a machine learning model.

According to some aspects, a method for determining a vertical and anterior-posterior ground reaction force using force sensor data from a plurality of force sensors positioned underfoot can include: obtaining force sensor data for a plurality of specified foot regions based on sensor readings from the plurality of force sensors during a first time period; based on the force sensor data, identifying at least one foot contact period within the first time period; obtaining a user mass, a user speed, and a user slope associated with the force sensor data for the first time period; and for each foot contact period, determining a corresponding vertical ground reaction force signal and a corresponding anterior-posterior ground reaction force signal based on the user mass, the user speed, the user slope, and the force sensor data for the plurality of specified foot regions during the corresponding foot contact period.

For each foot contact period, determining the corresponding vertical ground reaction force signal and the corresponding anterior-posterior ground reaction force signal can include inputting the user mass, the user speed, the user slope, and the force sensor data for the plurality of specified foot regions during the corresponding foot contact period to a neural network trained to output the corresponding vertical ground reaction force signal and the corresponding anterior-posterior ground reaction force signal.

The neural network can be a recurrent neural network. The recurrent neural network can have 9 layers.

The neural network can be trained by: obtaining concurrent force sensor training data and ground reaction force measurement training data; obtaining user mass training data, user speed training data, and user slope training data corresponding to the force sensor training data; defining the ground reaction force measurement training data as desired output data; inputting the force sensor training data, the user mass training data, the user speed training data, and the user slope training data to the neural network to cause the neural network to output predicted data; and training the neural network to minimize a cost function determined based on a difference between the desired output data and the predicted data.

The neural network can be a recurrent neural network and the final layer of the recurrent neural network can be a regression output layer and training the neural network to minimize the cost function can include optimizing the regression output layer to minimize a mean square error of the difference between the desired output data and the predicted data.

The regression output layer can be optimized using Adam optimization.

The method can include separating the force sensor data for each specified foot region into a distinct region dataset; and providing each region dataset to the neural network as a separate input.

The force sensor data can be acquired from a particular user; the neural network model can be initially trained using the force sensor training data, ground reaction force measurement training data, user mass training data, user speed training data, and user slope training data for a plurality of users; and the neural network can be enhanced for the particular user prior to determining the corresponding vertical ground reaction force signal and the corresponding anterior-posterior ground reaction force signal.

The neural network can be enhanced by: obtaining concurrent user-specific force sensor training data and user-specific ground reaction force measurement training data for the particular user; obtaining user-specific mass training data, user-specific speed training data, and user-specific slope training data for the particular user corresponding to the user-specific force sensor training data; defining the user-specific ground reaction force measurement training data as user-specific desired output data; inputting adjusted training data to the neural network to cause the neural network to output user-specific predicted data, wherein the adjusted training data includes the user-specific force sensor training data, the user-specific mass training data, the user-specific speed training data, and the user-specific slope training data in addition to the force sensor training data, the user mass training data, the user speed training data, and the user slope training data; and re-training the neural network to minimize the cost function determined based on a user-specific difference between the adjusted desired output data and the user-specific predicted data, wherein the adjusted desired output data includes the desired output data and the user-specific desired output data.

The plurality of specified foot regions can include 5 foot regions.

The force sensor data can be obtained as continuous-time force sensor data over the first time period.

Alternatively or in addition, some of the inputs may be adjusted or modified. For example, acceleration may be used as an input in place of peak force values.

At 350, the mechanical running power determined by the machine learning model at 340 can be output. This may provide a user with data representing the power output by their foot when performing an activity like running or walking. The output data can provide the user with insight into their level of performance while performing movement or an activity. The output data can additionally be used as an input to a game.

The mechanical running power can be output directly through an output device to provide a user with feedback on the activity being monitored. For example, the running speed may be transmitted to a mobile application on the user's mobile device (e.g. a processing device 108). This may allow the user to continuously improve mechanical efficiency while performing the activity. For example, the mechanical running power can be used for zone training. Zone training is a type of athletic training which encourages users to keep their metrics within a range or "zone" of values over a predetermined period of time (e.g. the length of a game). Users may be shown their position in a zone in real-time and may be rewarded for staying within the zone and/or penalized for leaving the zone. For example, a user may be given a mechanical running power zone to stay within for a running game. During the game, the user may be encouraged to keep their mechanical running power in the designated zone to achieve maximum points. The mechanical running power may be transmitted to a mobile application on the user's mobile device (e.g. a processing device 108). Alternatively or in addition, the mechanical running power may be stored, e.g. for later review, comparison, analysis, or monitoring.

The method 300 generally describes the process of determining mechanical running power for one leg. Optionally, method 300 may be applied to determine the mechanical running power for both of a user's legs, based, respectively, on data (e.g. sensor readings and IMU data) collected for each leg. Method 300 may be performed concurrently on the data collected for each leg in order to provide a user with real-time feedback of the mechanical running power generated by each leg.

Figure 4:
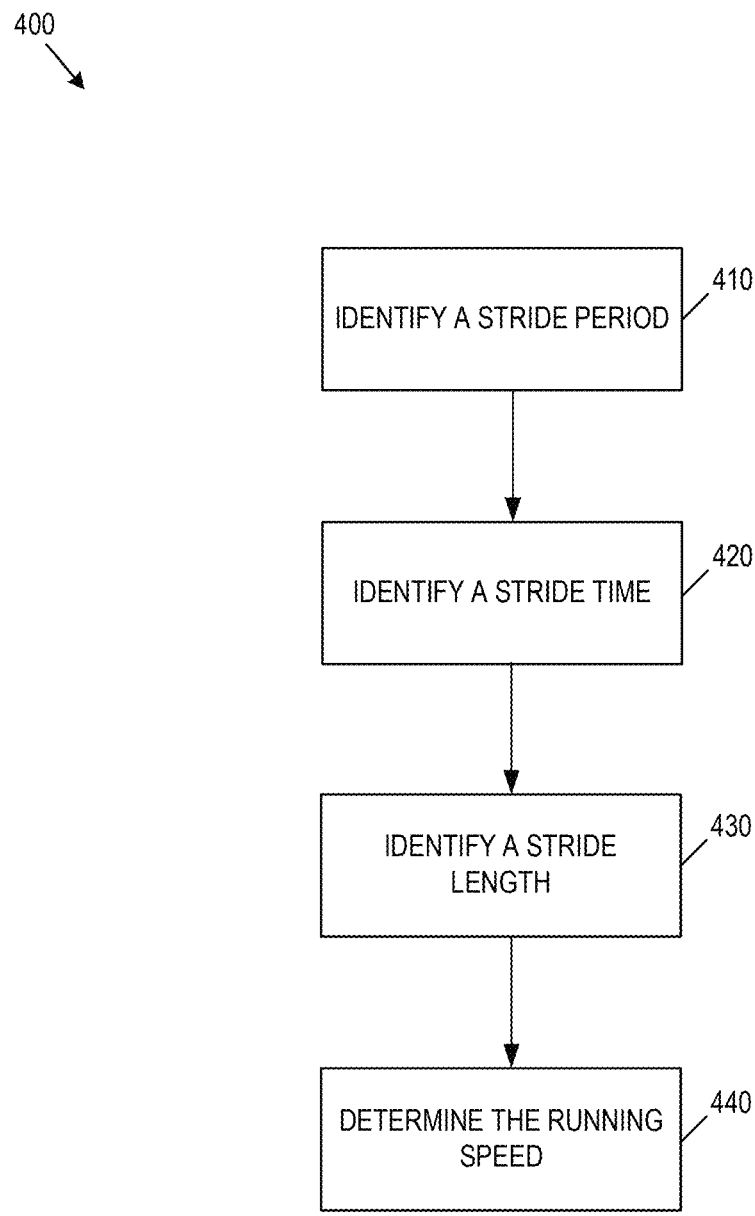
FIG. 4 is a flowchart illustrating an example of a method for determining running speed, which may be used with the method shown in FIG. 3.

Referring now to FIG. 4, shown therein is an example method 400 of determining running speed that may be used with a method of determining mechanical running power such as method 300. The method 400 may be applied to determine the running speed for an individual stride.

The method 400 is an example of a method for determining running speed using sensor data from an IMU in conjunction with sensor data from a plurality of force sensors positioned underfoot. Using IMU sensor data in combination with force sensor data to determine running speed can help improve the accuracy of the running speed estimation. Furthermore, using the IMU sensor data in combination with force sensor data can allow running speed to be estimated accurately across the variety of terrain that a user may encounter while performing an activity such as running.

At 410, a stride period can be identified for the corresponding stride. The stride period may be determined between the foot-contact times of adjacent strides (i.e. the stride period for a given stride begins at the time the user's foot first touches the ground and ends at the time immediately before the user's foot first touches the ground again after the swing phase of the same stride) or between the foot-off times of adjacent strides (i.e. the stride period for a given stride begins at the time the user's foot first leaves the ground following the stance phase of the preceding stride and ends at the time immediately before the user's foot first leaves the ground again after the stance phase of the given stride).

Accordingly, in order to identify the stride period a plurality of foot-contact times or a plurality of foot-off times can be identified. In some cases, both the plurality of foot-contact times and the plurality of foot-off times can be determined. The foot-contact times and/or foot-off times can be determined based on the sensor data received at 310, described herein above. As noted above, the foot-contact times and/or foot-off times can be determined based on the force sensor data received at 310 from the plurality of force sensors.

At 420, a stride time can be identified. The stride time can be identified as the length of time or duration of the corresponding stride period identified at 410. Accordingly, the stride time can be identified as the length of time between the foot-contact times of adjacent strides or between the foot-off times of adjacent strides.

At 430, a stride length can be identified. The stride length for the stride period (from 410) can be determined based on inertial measurement data received from an inertial measurement unit (e.g. as at 310). The stride length can represent the distance travelled by the foot over the course of the corresponding stride.

Each stride can include a foot contact period (i.e. a period during which the user's foot remains on the ground). The foot contact period can be identified as the period of time between the foot-contact time and the foot-off time identified for that stride. The foot contact periods for multiple strides can be used to determine the stride length for each stride.

A stride velocity can be determined for a given stride based on the inertial measurement data received from the IMU. The stride velocity can be determined using accelerometer data from the IMU. The accelerometer data can be integrated over the stride period to obtain the velocity.

In some cases, the accelerometer data may need to be transformed to a global reference frame prior to integration. Accordingly, determining the stride velocity can include transforming the accelerometer data to a global reference frame in order to generate transformed accelerometer data. The stride velocity can then be determined by integrating the transformed accelerometer data over the stride period.

The accelerometer data may be transformed to a global reference frame based on the angle of the user's foot when the accelerometer data is acquired. The foot angle can be determined using angular velocity data received from the IMU. To determine the foot angle, a subsequent foot flat time can be determined for the subsequent stride (i.e. the stride immediately succeeding the current stride). A foot flat time can also be determined for the current stride.

In some cases, each foot flat time may be determined using the inertial measurement data. For example, the inertial measurement data can include gyroscope data. A time of minimum gyroscope energy (the time when all three axes of the gyroscope have the least amount of measured angular rotation) for a given stride can be determined from the gyroscope data. The foot flat time can be identified as the time of minimum gyroscope energy for the corresponding stride.

Alternatively, the foot flat time may be determined based on the force sensor readings from the plurality of force sensors. The foot flat time can be identified as the time of maximal plantar force for the corresponding stride as determined from the sensor readings.

The foot angle can then be determined by integrating the angular velocity data from the foot-contact time to the foot flat time of the subsequent stride (i.e. from the foot-contact time of the current stride through the foot-flat and foot-off times of the current stride and through the foot-contact time of the subsequent stride to the next foot-flat time). The accelerometer data can then be transformed to the global reference frame based on the foot angle.

The foot flat time can also be used to determine whether the stride velocity includes any drift offset. A foot flat velocity value can be determined at the foot flat time of the current stride based on the integrated transformed accelerometer data. The stride velocity can then be adjusted based on the foot flat velocity value.

The velocity of a user's foot should be zero at the foot-flat time. Accordingly, if the stride velocity determined from integrating the accelerometer data is not zero at the foot flat time, the stride velocity at the foot-flat time can be identified as a drift offset. Accordingly, the drift offset can be subtracted from the stride velocity of the entire stride in order to adjust the stride velocity.

Once the stride velocity has been determined, it can be used to determine the stride displacement. The stride velocity can be integrated over the length of time between adjacent foot contact periods (e.g. from one foot-contact time to the next) to determine the corresponding stride displacement. The stride length can then be determined based on a combination of the directional components of the stride displacement. The directional components of the displacement can be root-summed-squared to calculate the stride length.

At 440, the running speed can be determined for the stride period. The running speed can be determined by dividing the stride length (from 430) by the stride time (from 420). The running speed may then be provided as an input to the machine learning model at 340 to determine the mechanical running power.

Optionally, the running speed can be output directly through an output device to provide a user with feedback on the activity being monitored. For example, the running speed may be transmitted to a mobile application on the user's mobile device (e.g. a processing device 108), allowing the user to continuously monitor and improve while performing the activity. Like mechanical running power, running speed or pace can be used for zone training. A user may select or be assigned a pace zone to maintain during an activity, such as a running game (where pace is the inverse of running speed). During the game, the user will be encouraged to keep their pace in the designated zone to achieve maximum points. Alternatively or in addition, the running speed may be stored, e.g. for later review, comparison, analysis, or monitoring.

The mechanical running power, the running speed, or some combination thereof may be outputs (i.e. an output dataset) of the system.

The outputs may be used as inputs to a game. A game could be a running training game, where a user is incentivized to improve their running technique and achieve new training goals. Alternatively, a game could be a non-running focused game that requires a user to run at select times in the game (e.g. a treasure hunt game where a user must run from a pirate during one level).

The way a user runs in real life may be recreated in a game, based on their outputs. For example, an avatar in a game may run at the same speed that a user runs in real life. The user may need to adjust their speed in real life in order to dodge obstacles in a game or to run along certain sections of a virtual track.

Virtual environments, objects, and avatars may be generated, with which a user can interact. The virtual environment and virtual objects can be altered based on the movements, gestures, and outputs of the user. Output devices (e.g. a television screen, a virtual reality headset, etc.) may be used to display the virtual environment to users. A user may visit a variety of virtual environments, including imaginary environments or environments that replicate real-life environments (e.g. the Boston Marathon route). When a user moves around while wearing the carrier unit, they will move around in and interact with the virtual environment accordingly.

A scaling factor may be applied to outputs in a game. The scaling factor may be an integer (e.g. 1, 2, 5, 10, etc.) or it may not be an integer (e.g. 0.2, 1.5, 2.6, 6.9, etc.). In one example, the scaling factor may be 1. In this case, the outputs are applied equivalently in a game (i.e. a 1:1 scaling). The running speed of an avatar in the game is equivalent to the running speed of a user in real life. In another example, the scaling factor may be 5. In this case, outputs are scaled 1:5 from real life to the game. The running speed of an avatar in the game is five times faster than the running speed of a user in real life. Gaming experiences that are directly based on a user's outputs allow users to have a more realistic and immersive gaming experience than games that are not based on a user's biometric data (e.g. games played with buttons on a controller). Output scaling may allow for superhuman performance enhancements in a game. For example, an avatar whose running speed is scaled by a scaling factor of 10 may be able to outrun a car in a game, but an avatar whose running speed is scaled by a scaling factor of 1 may not be able to outrun it. Different scaling factors may also be applied to different outputs. For example, a scaling factor of 2 may be applied to the running speed, but a scaling factor of 0.5 may be applied to mechanical running power. (An avatar may be able to run faster and longer than a real life user if the mechanical running power is scaled).

Outputs may also be applied to different environmental factors in a game. For example, the gravity in a game can be changed. The gravity can be changed to that of another planet, such as the gravity of Mars. The outputs can be applied to the new environmental factors, so a user can understand how they might perform in a different environment. The performance of the user under the original conditions and the simulated conditions can be shown on a visual display.

The virtual environment can display or generate an avatar representing the portion of a user's body to which the carrier unit is affixed. For example, if the carrier unit is a pair of insoles, a user's feet may be rendered in the virtual environment. A user may be able to change the skins and/or shoes applied to their feet in the virtual environment. For example, a user may choose a special type of running shoe to be shown in the virtual environment. Special objects and/or abilities may be associated with the virtual skins and shoes. For example, virtual lasers or swords may extend from the virtual shoes that can be used to fight villains in a game. As another example, virtual shoes may contain a special feature, where they can build up energy if a user performs a certain task or reaches certain goals. The built-up energy can be used to create a burst of power for an avatar in a running game.

Alternatively, the virtual environment can display or generate an avatar for the user's entire body. The appearance of the avatar's body may depend on the user's outputs. For example, if fast running speeds are frequently recorded for a user, their avatar may appear aerodynamic (e.g. wearing tight clothing). An avatar's appearance may also be location dependent. For example, if a user lives in a warm, dry climate, the avatar may be depicted in shorts and a t-shirt, with dried sand on their skin. Alternatively, if a user lives in the Arctic, their avatar may be depicted in a parka and furry boots. There may be location-dependent virtual items that can be unlocked. For example, if a user travels to another country in real life, they may unlock a special running shoe from that country. The carrier unit may contain a GPS system or another location-sensing system to enable the location-dependent items and features to be unlocked.

The outputs may also be used to model the dynamics of virtual objects and/or surroundings within a game, with which the user interacts. For example, if a user increases their running speed, their virtual surroundings in a game will appear to move faster by them. If a user's running avatar collides with a pylon while running, the pylon will be thrown in a trajectory defined by the user's running outputs.

Additionally, the outputs may be used to control a character in a lifestyle game. These games may require a user to virtually embody a certain lifestyle and complete tasks involved with the lifestyle. For example, a user may embody the lifestyle of an Olympic runner in a game. The user will be required to train like an athlete, and the outputs can be used to determine if the user has successfully completed the training. They may also be required to complete other tasks relating to the lifestyle of an Olympic athlete, such as taking rest days, taking part in competitions, achieving sponsorships, going on press tours, going grocery shopping, etc.

The system may also contain safety features to prevent collisions while running or gaming, using sensors and/or software included in the carrier unit. In one embodiment, wherein the carrier unit is an insole, software for the Bluetooth system may detect if a user's pair of insoles is in close proximity to another user's pair of insoles. Alternatively, GPS systems embedded in the insoles and optionally other objects may detect if a user is at risk of colliding with another user or object. The system may alert users if they are at risk of a collision. For example, if two running users approach the same street corner from different directions, they may be alerted to a possible collision. In another example, if a running user approaches a crosswalk at the same time as a car (a user in the car may be wearing a pair of sensorized insoles or the car's GPS system may communicate with the running user's insoles), the running user and/or the driving user may be alerted of a potential collision.

The system may be paired with other carrier devices in gaming scenarios. For example, the insoles may be paired with other wearable devices, such as wrist-worn IMUs. A gaming platform comprising multiple wearable game controllers at different locations on the body can encourage users to engage with a game using their full body, which may increase their workout and fitness during a game. The system may also be paired with fitness equipment. For example, the insoles can be paired with a treadmill for a running game. The incline of the treadmill can change in response to different virtual terrains (e.g. running up a virtual mountain), and the user's outputs, as determined from the insoles, can determine how they are performing in the game. Visual display carrier units, such as VR headsets, smart glasses, and smart goggles, may also be paired with the insoles to increase the immersivity of games.

The system may also contain additional sensor types, whose data can be used to augment gaming experiences. In particular, temperature sensors may provide various advantages for health and gaming applications. The system may include one or more temperature sensors used to measure body or environmental temperature. In a first example, one or more temperature sensors (e.g. thermistors) may be included in a flexible printed circuit within the bulk of the insole. The one or more temperature sensors can detect temperature changes from the body. The temperature changes may be used in an algorithm that adjusts other sensor (e.g. force sensor) readings to account for temperature drift. Alternatively, the one or more temperature sensors may be used to measure the body temperature of users for health and gaming calculations (e.g. calorie burn calculations or task readiness calculations). In another example, the one or more temperature sensors may be affixed to the outside of the shoe or at other locations away from a user's body to determine the external temperature. The external temperature may be used in gaming to send safety messages and notifications to users (e.g. if the external temperature is hot, a user may receive a notification suggesting they hydrate more frequently). The external temperature may also be used to adjust health and gaming calculations and may be used to adjust the virtual environment in a game (e.g. if the external temperature is hot, the game may place the user in a virtual desert).

Additionally, outputs may contribute to scoring in a game. For example, a performance score may be calculated from the outputs. Improvements in the outputs may result in an increase in the number of points earned in a game, incentivizing users to improve and safely push their limits when running.

The outputs and performance scores can be accumulated based on a user's participation in various activities providing a standardized way to incentivize or reward users for movement in non-gaming (e.g. athletic) and gaming activities.

One or more normalization factors may be defined to allow the outputs and/or performance scores to be determined fairly for different users. Normalization factors may be applied to account for factors such as mass, weight, age, gender, natural athletic ability, game skill, other physical characteristics, or any combinations thereof.

The calculation of performance scores can also include modification factors such as multipliers and bonuses for successful completion of objectives including streaks, skillful movement combinations, and/or other unique game experiences such that performing the same in-game action may not yield the same performance scores each time.

The performance scores and/or outputs can also be used to determine other gaming-related metrics for a user. For example, a user can be associated with one or more user levels. The user levels generally refer to the experience of a user within a game. User levels may be used to compare users to one another, or to establish progression in fitness and experience over time.

The performance score and the outputs may also be used to assign and to track progress towards achieving training goals within a predetermined time period. For example, based on a user's mechanical running power values over one week, a training goal can be generated for the user to achieve the same or greater mechanical running power values the subsequent week. The user's mechanical running power can then be tracked the subsequent week to determine the user's percentage of progress towards achieving the training goal.

Training goals can relate to accumulated performance scores, the outputs, system usage metrics, or some combination thereof, that should be achieved in a predetermined time period (session, day, week, month, year, season, etc.) or instantaneous values (i.e. a rate) that should be achieved at a certain point in time. Training goals may be suggested by the processing system based on previous activities, be chosen by the user, or be presented as part of a challenge from another user or group of users. Suggested training goals can become increasingly targeted for users as additional sensor data is collected by the system over time.

Training goals can be directed toward weight loss. Wherein the carrier unit is an insole containing force sensors, body weight or mass can be measured by the insoles. Alternatively, an external device may be used to measure body weight or mass and transmit the values to the input device 102, remote processing device 108, or cloud server 110. If a user has a training goal to lose a certain amount of weight, the processing system may recommend certain activities to help them accomplish their goal. In particular, the processing system may recommend fitness-related games that can be played with the carrier unit. For example, for an overweight user, the system may suggest low impact, high calorie burning running games. The system may create a fitness-based game schedule for the user to follow, to encourage increased activity and intensity as the user's body weight or mass decreases (i.e. as their percentage of progress towards achieving the training goal increases). The system may also include a virtual coach to help the user in their weight loss journey. A user may participate in virtual weight loss groups and/or rooms to encourage participation and support through interacting with other users with similar training goals. Weight loss may also be encouraged through badges, virtual gifts, streaks, and other virtual achievements.

Training goals may also be directed toward education. Specific games and activities may integrate educational concepts (e.g. a running game that helps users learn a new language). The same social interactions and virtual achievements in the weight loss example may also apply to a user's journey with an educational goal.

Additionally, the outputs may also be used to assess a user's technique when performing an activity or movement (i.e. their quality of movement). Wherein the carrier unit is an insole containing force sensors, a user's outputs may be recorded and stored in the system memory for an activity, such as running. As further data is collected for the user, the system may compare previous data against new data to determine differences in technique to notify the user of fatigue or of a potential injury. Alternatively, the system may compare data contralaterally (i.e. between opposing limbs) to determine differences in technique. To assess technique, a machine learning model may be trained on data that includes both "correct" and "incorrect" versions of an activity. In implementation, the model can then classify an activity as "correctly" or "incorrectly" performed. Alternatively, the model can be trained on data that includes rankings (e.g. by a clinician or sports scientist) on technique of certain activities (e.g. a 0 to 5 ranking, where 0 indicates that an activity was poorly executed and where 5 indicates that an activity was perfectly executed). In implementation, the system can reject exercise tasks below a certain ranking and/or output the ranked value. In another example, technique can be assessed based on conditions or restrictions set for each activity. For example, if running is the task being assessed, there may be a cut-off bilateral asymmetry value (e.g. no more than 5% difference between the two feet). A user's outputs can be used to determine if the condition was met. If the user does not meet the condition or restriction, their technique may be deemed unacceptable.

In a further example, the outputs may also be used to determine a user's "readiness" to participate in a game or activity. For example, a user's historical output data for 10 km runs may be used to determine a user's readiness to run a marathon. Alternatively, other data that can be collected from the insoles (e.g. center of pressure, ground reaction force, etc.) can be used to determine a person's readiness to participate in a run or a running game.

Task readiness refers to a user's ability to perform a task at a moment in time. It is assessed by having a user perform a task, such as a jump, squat, balance, sprint, series of steps, or another physical exercise. The exercise may be included as part of a game or challenge or may be separate from game play. Injury potential, technique, and/or fatigue state of the user may be incorporated in a task readiness score or may be pulled out of the task readiness score and displayed as a separate score. The task readiness, injury potential, technique, and/or fatigue state scores may be recorded over time and may be displayed in a metrics report. The metrics report may be used to quantify improvements and overall fitness. The real-time readiness scores of the user may be reported to the user on the input device 102, remote processing device 108, or cloud server 110. For example, on a display of the remote processing device, a poor task readiness score may be reported as a red bar, an average task readiness score as a yellow bar, and a good task readiness score as a green bar in the top corner of the display. The task readiness feedback may alert the user to a deteriorating quality of their movements, which can be used to make an informed decision on continuation of game play. The task readiness scores may be used to recommend games that are appropriate for the user's physical state (e.g. their fitness level) at a certain point in time. For example, consistently high task readiness scores over a period may indicate that a user should play more advanced games to improve their fitness level. The system may recommend more advanced games to the user or higher-level players to compete against. The task readiness scores may also be used to recommend rest periods for the user or to coach the user through auditory means, visual means, tactile means, or any combination thereof. For example, a virtual coach may be used to instruct the user on how to improve movement quality to gain more points, prevent injury, or achieve another goal in the game.

A virtual coach may be used to assist a user with meeting their training goals. The virtual coach may be trained through machine learning or other algorithms to give suggestions, notifications, and encouragement to the user relating to the training goal. Alternatively, a personal trainer, physiotherapist or other expert in the field may assess a user's historical outputs to develop and suggest training goals and paths to achieving training goals within the game.

Feedback may also be provided to users based on their outputs. For example, a user may be assigned a goal of staying within a certain mechanical running power zone for a run or series of runs. If the user begins to fall outside of that zone, they may be alerted. Feedback may be provided in the form of haptic feedback, such as with vibrational motors embedded in the carrier unit.

Feedback may also be provided in the form of an audio signal. A user's outputs may be sonified and played in real time or post-activity for the user. For example, if a user goes on a run, their mechanical running power can be sonified and played in real time. The user can then sonically identify changes in their mechanical running power, and they can make real time adjustments to their running technique to maintain or improve their performance. Signal processing techniques may be used to increase the effects of sonification. For example, signals may be amplified, such that the sonification spans a broader range of tones than an unamplified signal, which may make it easier for users to identify changes in tone. Signals may also be layered. For example, the signals from the right and left foot may be added together prior to sonification, or the sonifications from the right and left foot may be played simultaneously. Signals may also be filtered to minimize noise, which may be distracting to a user once the signal is sonified. Visual feedback may also be provided by the system.

Users may review their feedback and data (e.g visualizations, sonifications, and haptics) during or after an activity. Real-time feedback may encourage users to continue to engage with the activity at a higher level of intensity or to increase their intensity. Post-activity data reviews may encourage users to understand their activity and movement statistics to prepare for improvements in the next activity.

Sonification of outputs may also be used for artistic purposes. For example, the output metrics may correspond to certain musical features, such as notes, instruments, tempos, and volumes. In one embodiment, running speed may control the tempo of the music. As a user runs faster, the tempo of the music will increase. Mechanical running power may control the volume of the music. As a user's mechanical running power increases, so will the volume of the music. Users may work together to create music. For example, if two users go running, one user's sonification may create a melody and the other user's sonification may create a harmony. In this regard, users can generate music in real time with their bodies. Similarly, users, such as DJs, may be able to mix music in real time. For example, a DJ may run on a treadmill at a concert while wearing the insoles, and by changing their running technique, they can cue tracks and increase or decrease the speed of tracks.

The outputs may also be used to create visualizations. Visualizations may be data driven (e.g. graphs) or artistic visuals (e.g. data-inspired paintings). For example, a user may be able to "paint" with their insoles by changing their running technique, and their foot gestures while running may be used to create different "brush strokes". A large display screen may be used to show a user's outputs while they are running, racing, or gaming.

Additionally, information may be communicated to and/or between users through visual, audio, or haptic cues. For example, the system may send a haptic cue to a user's insoles to prompt them to complete a daily challenge based on their output data. The results of their daily challenges may be compared with the results of other users. Alternatively, if cues are sent between users, a first user in a game can challenge a second user in a game to perform an activity by sending a haptic cue to the second user's carrier unit. The communicated information may be based upon the two users' outputs. For example, the first user may send a haptic cue to the second user to challenge them to a run, where the user with the highest mechanical running power during the run will be declared the winner.

Users may also be able to create levels or challenges for other users based on their outputs. For example, a first user may create a challenge that involves running up a steep hill. If a second user wishes to perform the challenge, they will be required to produce outputs (such as mechanical running power) that indicate that they performed an equivalently challenging or more challenging task (e.g. running faster up a hill of the same incline).

The performance scores and/or outputs may be displayed on an output device, as part of the remote processing device 108 or cloud server 110. A user may also be able to interact with a visual display via an interactive medium (e.g. a touchscreen) on the output device. Examples of data visualizations that may be provided on the visual display based on the performance scores and/or outputs of a user using the carrier unit include: foot pressure maps to show the pressure distribution on the insoles, foot pressure maps to show the movement of the center of pressure, points displays (e.g. performance score), pop-up notifications of errors in movement, pop-up notifications with suggestions to correct the movement, graphs showing changes in data over time, colour codes (e.g. different colour pop-ups for different performance scores or gestures), footprints whose shapes are estimated based on a user's outputs, footprints whose depths are estimated based on a user's outputs, cumulative displays (e.g. accumulation of mechanical running power, which, when a certain level is reached, may be used to provide a burst of power for an avatar in a game), or combinations thereof. The data visualizations may be altered or enabled or disabled by users, with toggles, buttons, or other actions.

The output device may also display information (such as names, outputs, etc.) of other users in the same area using the same type of system. Carrier units may contain GPS systems or other location-sensing systems to enable viewing information of other users in the same area. Location-sensing may provide opportunities for virtual social interactions between users. Examples of social interactions include gift exchanges, meet-ups in virtual rooms, messaging, game challenges, cooperative games, competitive games, combination games (i.e. games with a competitive and cooperative aspect), tournaments, leaderboards (e.g. for age groups, geographic locations, specific games, etc.), and the ability to "follow" and/or "friend" other users (i.e. adding users to a list of "friends" on the system platform). Other virtual social interactions known in the art, but not listed here, may also be included.

Virtual meeting rooms are digital areas where users may send messages or chats with one another, play games together, and participate in social interactions with other users. The system may have virtual meeting rooms available, or users may create and design their own virtual meeting rooms. The owner of a virtual meeting room may allow open access to the virtual meeting room, or they may restrict access to certain users. The owner may invite users to join their virtual meeting room.

Social interactions may also include competitive races against the same user (i.e. their previous metrics), other users, a "computer", celebrities and/or professionals. For example, a user may enable a "ghost" mode, where they can view their previous performances when repeating an activity, to compete against themselves. For example, in a game where a user is required to perform a running task, they can view a "ghost" of their avatar's best performance while repeating the activity, along with a display window showing the ghost's outputs, to encourage the user to match or improve the run. In another example, in the running game, the user may enable "ghost" mode to view the outputs of a 5000 meter professional runner, who recorded their outputs in the game for other users to copy. The user can work towards matching the professional runner's data to improve their own performance. In another example, a professional runner may create a virtual competition where users can compete against the professional for a month-long running challenge. The participating users' outputs can be compared to the professional's outputs to determine if any of the users beat the professional. Users who participate in and/or win the challenge may receive a virtual reward.

Although the systems, methods and devices have been described primarily in the context of activities such as running or walking, the systems, methods and devices described herein can be applied in the context of various activities in which a user takes a series of strides (e.g. sports, occupational activities, military performance etc.).

EXAMPLES

An implementation of the systems and methods described herein was tested. In particular, an implementation of method 300 using a plurality of force sensors and an IMU mounted in an insole and a LASSO model trained to generate an average positive running power and an average negative running power for a plurality of strides using 13 inputs (a running speed value, a slope value, a stance time value, five region-specific peak force values and five region-specific mean force values) was tested to evaluate the accuracy of determining the mechanical running power. The mechanical running power generated by the tested implementation was compared against the average positive and negative power of strides as calculated by a force-instrumented treadmill.

Running data was collected from 16 users, for a total of 19,262 strides. A physics-based approach was used to calculate mechanical running power from the sensor readings acquired from the plurality of force sensors. The physics-based approach was defined using the following equation:

$$P = v_v * \text{vGRF} + v_{ap} * \text{apGRF}$$

where $v_v$ represents the vertical velocity as calculated from the insole IMU, $v_{ap}$ represents the anterior-posterior velocity as calculated from the insole IMU, vGRF represents the vertical ground reaction force as calculated from the insoles using a recurrent neural network with force, speed, and slope inputs, and apGRF represents the anterior-posterior ground reaction force as calculated from the insoles using a recurrent neural network with force, speed, and slope inputs.

Figure 5A:
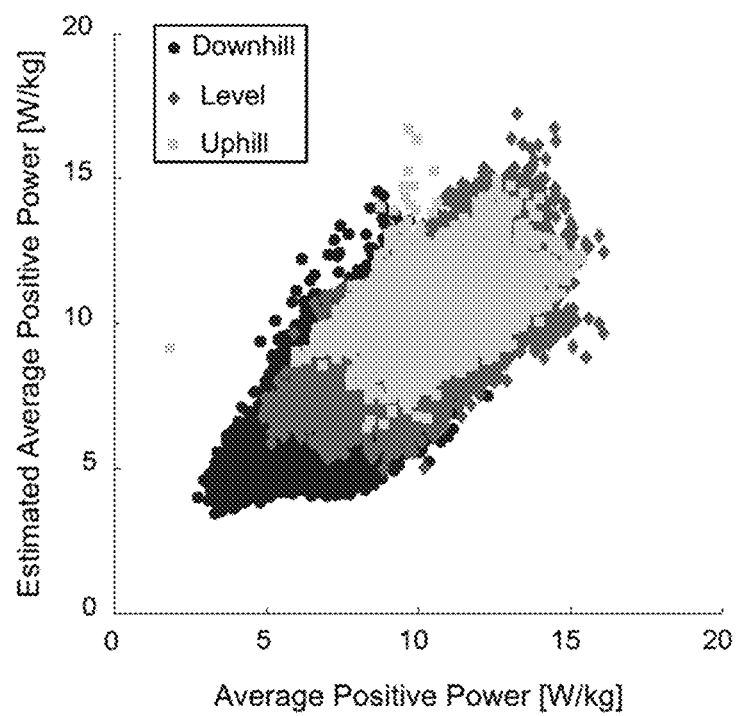
FIG. 5A is a plot illustrating the average positive running power determined by a physics-based approach using force sensor data from force sensors mounted on an insole (Y-axis) and the average positive running power determined by a force-plate (FP) instrumented treadmill (X-axis)
Figure 5B:
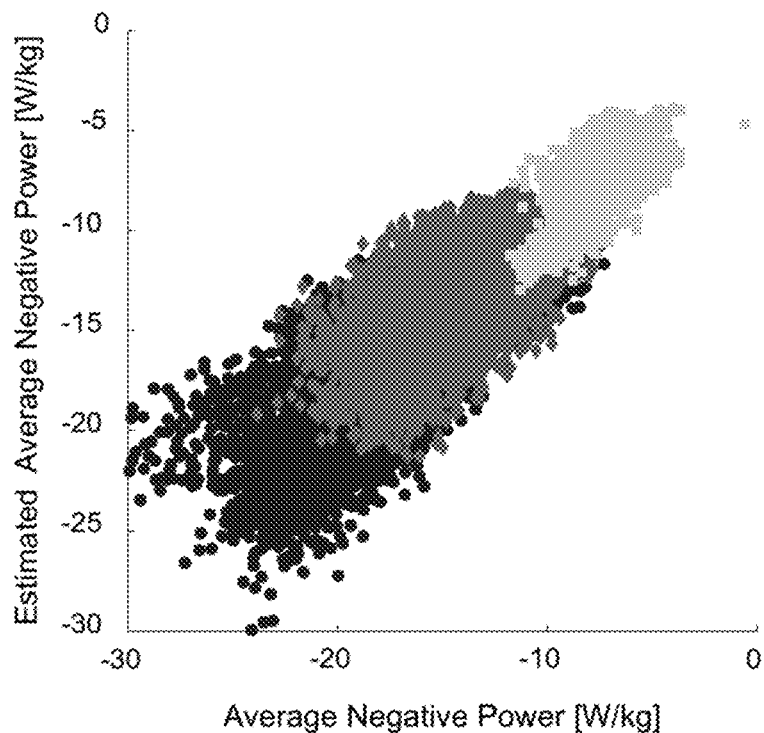
FIG. 5B is a plot illustrating the average negative running power determined by a physics-based approach using force sensor data from force sensors mounted on an insole (Y-axis) and the average negative running power determined by a force-plate (FP) instrumented treadmill (X-axis)

FIG. 5A-5B illustrates the results of determining the mechanical running power using the physics-based approach as compared to the mechanical running power determined by the force-instrumented treadmill. FIG. 5A illustrates a plot of the average positive running power of strides (in Watts/kg) while FIG. 5B illustrates a plot of the negative running power of strides.

Figure 6A:
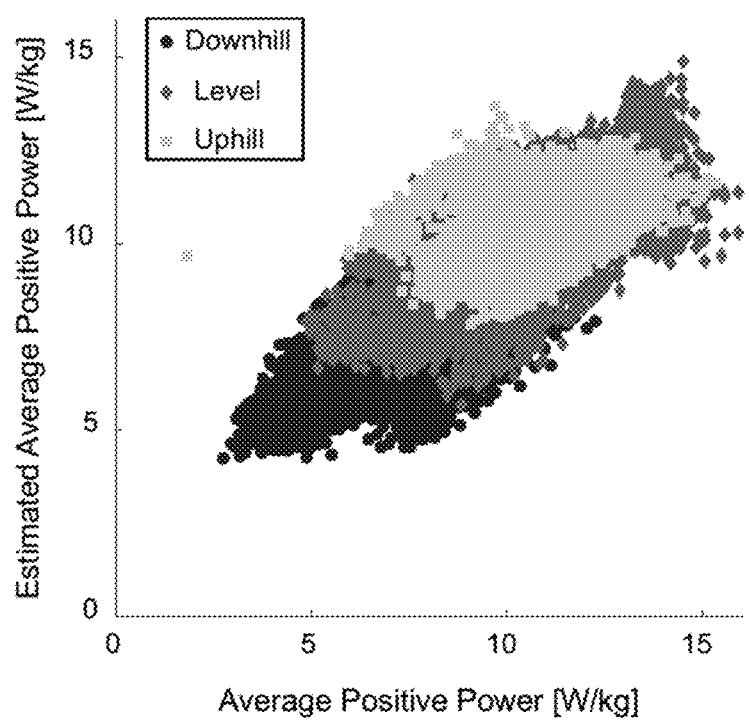
FIG. 6A is a diagram illustrating the average positive running power determined by an implementation of the method of FIG. 3 using force sensor data from force sensors mounted on an insole (Y-axis) and the average positive running power determined by a force-plate instrumented treadmill (X-axis)
Figure 6B:
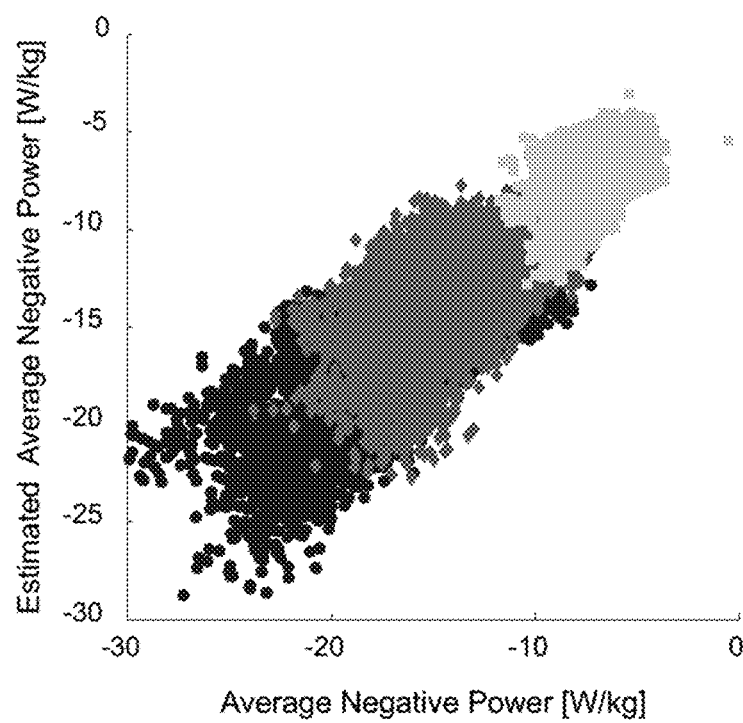
FIG. 6B is a diagram illustrating the average negative running power determined by an implementation of the method of FIG. 3 using force sensor data from force sensors mounted on an insole (Y-axis) and the average negative running power determined by a force-plate (FP) instrumented treadmill (X-axis)

The example implementation with a LASSO regression model was then applied to determine the mechanical running power for the same set of data. FIG. 6A-6B illustrates the results of determining the mechanical running power using an example implementation of methods 300 and 400 as compared to the mechanical running power determined by the force-instrumented treadmill. In the example implementation of methods 300 and 400, the slope value was determined from the setting of the force-instrumented treadmill. FIG. 6A illustrates a plot of the average positive running power of strides (in Watts/kg) while FIG. 6B illustrates a plot of the negative running power of strides.

Table 1 shows the overall accuracy of determining the average positive power and the average negative power using the physics-based approach (the results shown in FIGS. 5A and 5B) and using the example implementation of the methods 300 and 400 (the results shown in FIGS. 6A and 6B). For each method, Table 1 shows the root-mean square error (RMSE), correlation and mean absolute percentage error (MAPE) of determining the average positive power and the average negative power. All of the values in Table 1 are shown as mean values±standard deviations. As table 1 shows, the example implementation of methods 300 and 400 provides increased accuracy even as compared to a physics-based approach in which the vertical and anterior-posterior ground reaction forces were determined using a recurrent neural network.

|  | Average Positive Power | | | Average Negative Power | | |
| --- | --- | --- | --- | --- | --- | --- |
|  | Correlation | RMSE [W/kg] | MAPE [%] | Correlation | RMSE [W/kg] | MAPE [%] |
| Physics-Based Approach | 0.93 ± 0.06 | 1.52 ± 0.54 | 15.31 ± 5.95 | 0.97 ± 0.02 | 1.93 ± 0.95 | 12.85 ± 6.34 |
| LASSO Regression Model | 0.95 ± 0.03 | 1.23 ± 0.56 | 13.02 ± 6.96 | 0.97 ± 0.22 | 1.87 ± 0.93 | 13.10 ± 6.60 |

An implementation of method 400 using a plurality of force sensors and an IMU mounted in an insole was also tested to evaluate the accuracy of determining the running speed. The results generated by the implementation of method 400 were also compared to the running speed generated using IMU data alone. Both methods were tested across a series of different running slopes.

Test data were collected from 18 users running on a force-instrumented treadmill (Bertec, Columbus, OH, USA) while wearing an implementation of the sensor unit 200 including an IMU and a plurality of force sensors. Each user ran on the treadmill with the incline set to level ground followed by uphill on a 10.5% grade and downhill on a 10.5% grade. Each user ran on level ground at 9.4 km/hr, 10.8 km/hr, 12.2 km/hr and 13.7 km/hr, uphill at 9.4 km/hr, 10.1 km/hr and 10.8 km/hr, and downhill at 9.4 km/hr, 10.1 km/hr and 10.8 km/hr and 12.2 km/hr for one minute each.

Running speed was then computed using the implementation of method 400 and a method based on IMU data alone for each user using the sensor data from the implementation of the sensor unit. The mean absolute percent errors for each running speed and slope were then computed to evaluate both running speed algorithms against the treadmill belt speed setting. The running speed percent errors for both methods were then statistically compared with paired t-tests.

Figure 7A:
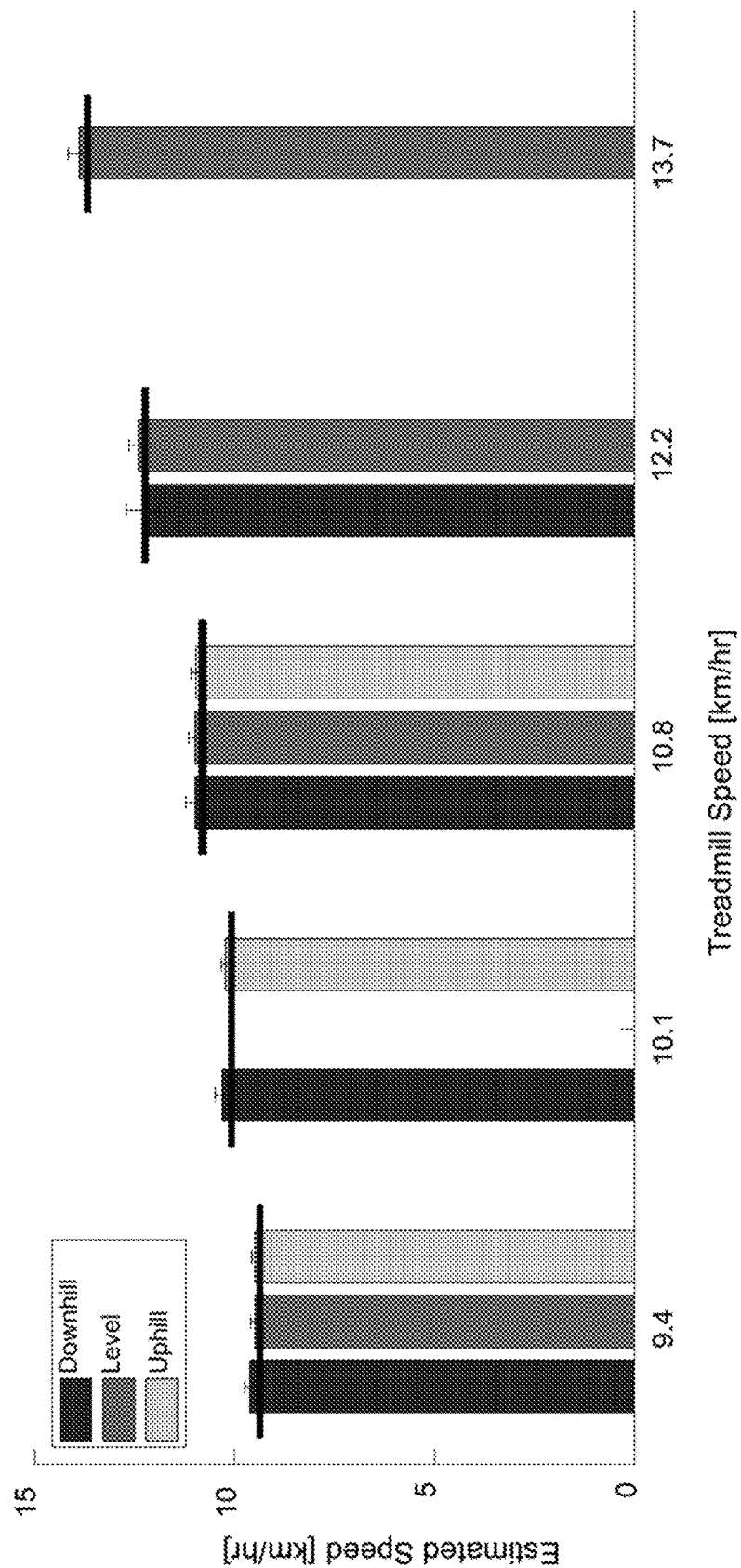
FIG. 7A is a diagram illustrating estimated running speed values determined by an implementation of the method of FIG. 4 using force sensor data.

FIG. 7A illustrates a plot of the estimated running speed as computed by the implementation of method 400 across the different test speeds and slopes (for a total of over 21,000 strides). The plot shown in FIG. 7A also includes the mean running speed and standard deviation of the running speed calculated from the plurality of test subjects 400 across the different test speeds and slopes. For each setting, the treadmill speed setting is indicated by the horizontal black line.

Figure 7B:
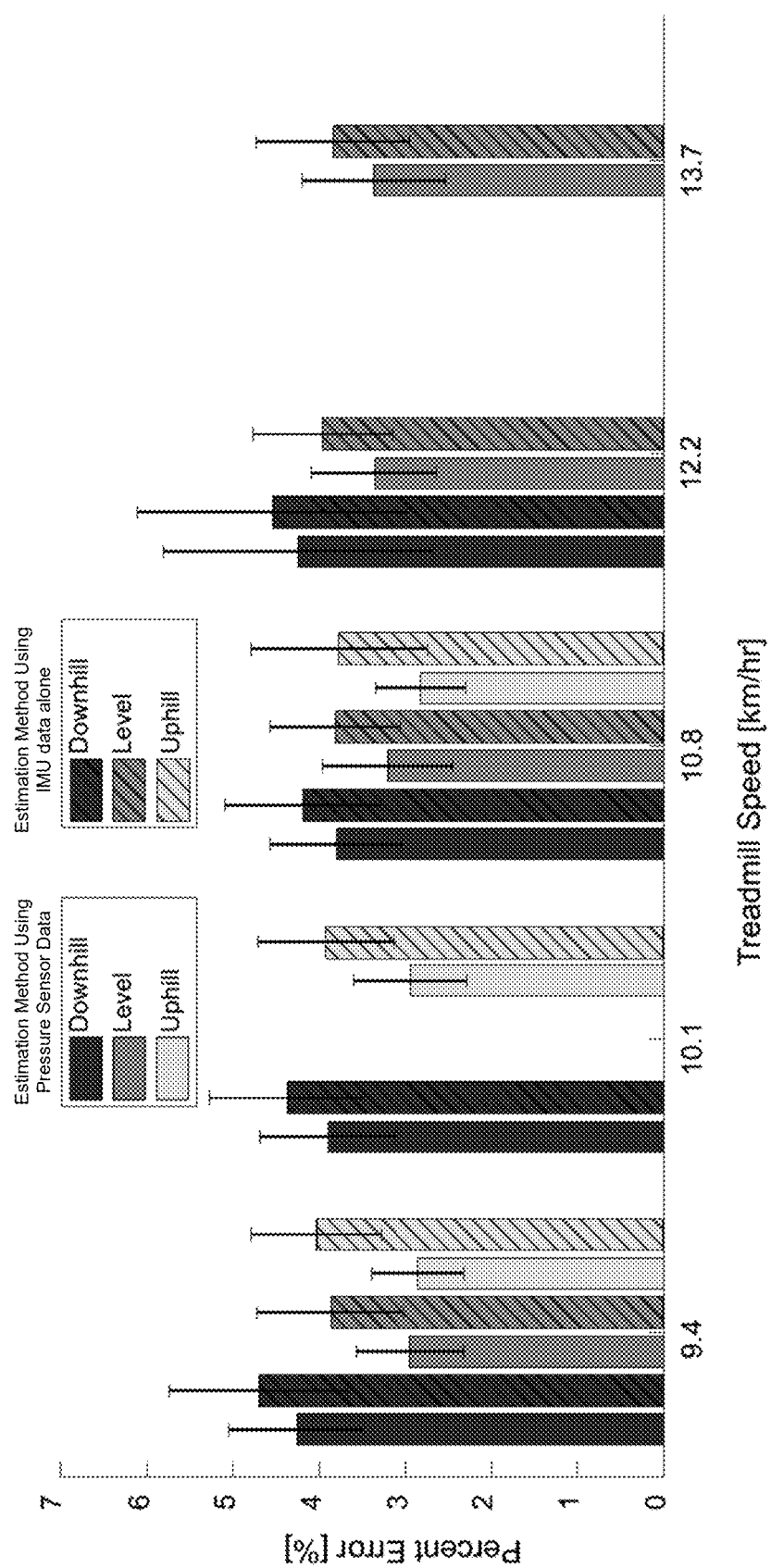
FIG. 7B is a diagram illustrating the percentage error of estimated running speed values determined by an implementation of the method of FIG. 4 using force sensor data and the percentage error of estimated running speed values determined using IMU data alone.

FIG. 7B illustrates a plot of the mean absolute percent error and standard deviations in error of the estimated running speed computed by the implementation of method 400 (shown by the bars without hatching) and the method based on IMU data alone (shown by the bars with hatching).

As shown in the plot of FIG. 7B, the example implementation of method 400 produced an average error below 4.3%. For all tested speeds and slopes, the example implementation of method 400 insole reduced the average percent error as compared to the method based on IMU data alone by up to 29% ($p<0.001$, FIG. 7B). For user subjects, the error was reduced up to 54%.

Regardless of the speed or slope, the example implementation of method 400 had a lower running speed error than the method based on IMU data alone. Additionally, example implementation of method 400 had an average error of 3.0% on level ground, which is better than existing IMU-only based algorithms (3.5-6.9%) (see, for example, M. Zrenner, S. Gradl, U. Jensen, M. Ullrich, and B. M. Eskofier, "Comparison of Different Algorithms for Calculating Velocity and Stride Length in Running Using Inertial Measurement Units," Sensors, vol. 18, no. 12, November 2018, doi: 10.3390/s18124194).

The improved accuracy provided by the example implementation of method 400 can allow users to better track their workouts and overall performance. Accurate running speed estimates can also be used to compute additional biomechanical metrics such as ground reaction forces and running power.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method for determining running power using force sensor data from a plurality of force sensors positioned underfoot, the method comprising:
    obtaining a plurality of force sensor readings from the plurality of force sensors, the plurality of force sensors disposed on a wearable device that is worn on a foot;
    determining force values for a plurality of strides using aggregate force data based on the force sensor readings;
    for each stride in the plurality of strides, determining a slope value, a stance time value, and a running speed;
    determining a mechanical running power associated with the plurality of force sensor readings by inputting the force values, the slope value, the stance time value and the running speed to a machine learning model trained to predict the mechanical running power;
    outputting an output dataset, wherein the output dataset comprises the mechanical running power; and
    using the output dataset as an input to a game.

2. The method of claim 1, wherein determining the force values comprises determining at least one mean force value or at least one peak force value.

3. The method of claim 2, wherein the aggregate force data is separated into a plurality of foot regions and determining the at least one mean force value or the at least one peak force value comprises determining a region-specific mean force value or a region-specific peak force value for each foot region.

4. The method of claim 1, further comprising:
    identifying the plurality of strides by:
        identifying a plurality of foot-contact times based on the force sensor readings and/or a plurality of foot-off times based on the force sensor readings; and
        identifying each stride as a stride period between adjacent foot-contact times or between adjacent foot-off times.

5. The method of claim 4, wherein for each stride, determining the running speed comprises:
    identifying a stride time as the length of the corresponding stride period;
    identifying a stride length for the corresponding stride period based on inertial measurement data received from an inertial measurement unit; and
    determining the running speed as the stride length divided by the stride time.

6. The method of claim 5, wherein each stride includes a foot contact period between the foot contact time and the foot off time and identifying the stride length comprises:
    determining a stride velocity based on the inertial measurement data;
    integrating the stride velocity over the length of time between adjacent foot contact periods to determine a stride displacement; and
    determining the stride length based on a combination of directional components of the stride displacement.

7. The method of claim 6, wherein the inertial measurement data comprises accelerometer data and determining the stride velocity comprises:
    determining transformed accelerometer data by transforming the accelerometer data to a global reference frame; and
    determining the stride velocity by integrating the transformed accelerometer data.

8. The method of claim 1, wherein the machine learning model is a regression model or a Least Absolute Shrinkage and Selection Operator (LASSO) model.

9. The method of claim 1, wherein the machine learning model is trained using training data generated by collecting training sensor readings and calculating a training average positive power and a training average negative power of each stride using a force-instrumented treadmill.

10. The method of claim 1, wherein the mechanical running power is determined as a time-continuous mechanical running power or an average positive power and an average negative power of each stride.

11. The method of claim 1, further comprising:
receiving inertial measurement data from an inertial measurement unit;
for each stride, determining a vertical velocity and an anterior-posterior velocity based on the inertial measurement data; and
calculating an estimated mechanical running power using the vertical velocity, the anterior-posterior velocity, and the force values; and
wherein determining the mechanical running power comprises inputting the estimated mechanical running power to the machine learning model along with the force values, the slope value, the stance time value and the running speed.

12. The method of claim 11, wherein the estimated mechanical running power P is calculated according to:

$$P = v_v * \text{vGRF} + v_{ap} * \text{apGRF}$$

where $v_v$ represents the vertical velocity, $v_{ap}$ represents the anterior-posterior velocity, vGRF represents a vertical ground reaction force determined from the force values, and apGRF represents an anterior-posterior ground reaction force determined from the force values.

13. A system for determining running power, the system comprising:
a plurality of force sensors positionable underfoot;
one or more processors communicatively coupled to the plurality of force sensors; and
a non-transitory storage memory storing a machine learning model trained to predict mechanical running power;
wherein the one or more processors are configured to:
obtain a plurality of force sensor readings from the plurality of force sensors;
determine force values for a plurality of strides using aggregate force data based on the force sensor readings;
for each stride in the plurality of strides, determine a slope value, a stance time value, and a running speed;
determine the mechanical running power associated with the plurality of force sensor readings by inputting the force values, the slope value, the stance time value and the running speed to the machine learning model;
output an output dataset, wherein the output dataset comprises the mechanical running power; and
use the output dataset as an input to a game.

14. The system of claim 13, wherein the plurality of force sensors are disposed on an insole, a shoe, a compression-fit garment, or a sock.

15. The system of claim 13, wherein the one or more processors is further configured to generate an audio signal or a visual display based on the output dataset.

16. The system of claim 13, further comprising an inertial measurement unit associated with the plurality of force sensors and wherein the one or more processors are configured to determine the slope value based on inertial measurement data received from the inertial measurement unit.

17. The system of claim 13, wherein the one or more processors are configured to identify the plurality of strides by:
identifying a plurality of foot-contact times based on the force sensor readings and/or a plurality of foot-off times based on the force sensor readings; and
identifying each stride as a stride period between adjacent foot-contact times or between adjacent foot-off times.

18. The system of claim 17, wherein the one or more processors are configured to, for each stride, determine the running speed by:
identifying a stride time as the length of time of the corresponding stride period;
identifying a stride length for the corresponding stride period based on inertial measurement data received from the inertial measurement unit; and
determining the running speed as the stride length divided by the stride time.

19. The system of claim 13, wherein the one or more processors are configured to:
receive inertial measurement data from an inertial measurement unit associated with the plurality of force sensors;
for each stride, determine a vertical velocity and an anterior-posterior velocity based on the inertial measurement data; and
calculate an estimated mechanical running power using the vertical velocity, the anterior-posterior velocity, and the force values; and
determine the mechanical running power by inputting the estimated mechanical running power to the machine learning model along with the force values, the slope value, the stance time value and the running speed.

* * * * *